(12) United States Patent
Kimura

(10) Patent No.: US 8,164,652 B2
(45) Date of Patent: *Apr. 24, 2012

(54) MOS SENSOR AND DRIVE METHOD THEREOF

(75) Inventor: Hajime Kimura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/869,872

(22) Filed: Aug. 27, 2010

(65) Prior Publication Data

US 2010/0321548 A1 Dec. 23, 2010

Related U.S. Application Data

(60) Continuation of application No. 11/802,634, filed on May 24, 2007, now Pat. No. 7,787,039, and a division of application No. 09/864,280, filed on May 25, 2001, now Pat. No. 7,224,391.

(30) Foreign Application Priority Data

May 26, 2000 (JP) ................................. 2000-156111

(51) Int. Cl.
*H04N 5/235* (2006.01)
*H04N 5/335* (2011.01)

(52) U.S. Cl. ..................................... 348/230.1; 348/297

(58) Field of Classification Search ........................ None
See application file for complete search history.

(56) References Cited

U.S. PATENT DOCUMENTS

| | | | |
|---|---|---|---|
| 4,839,735 A | 6/1989 | Kyomasu et al. | |
| 5,396,289 A | 3/1995 | Nakamura | |
| 5,541,654 A | 7/1996 | Roberts | |
| 5,650,643 A | 7/1997 | Konuma | |
| 5,726,439 A | 3/1998 | Miyawaki et al. | |
| 5,872,596 A | 2/1999 | Yanai et al. | |
| 5,886,343 A | 3/1999 | Miyawaki et al. | |
| 5,991,467 A * | 11/1999 | Kamiko | 382/312 |
| 6,040,570 A | 3/2000 | Levine et al. | |
| 6,072,206 A | 6/2000 | Yamashita et al. | |
| 6,230,975 B1 | 5/2001 | Colley et al. | |
| 6,307,956 B1 | 10/2001 | Black | |

(Continued)

FOREIGN PATENT DOCUMENTS

EP 0 626 785 A2 11/1994

(Continued)

OTHER PUBLICATIONS

Office Action, Notification of Reason for Refusal (Japanese Application No. 2000-156111) Dated Apr. 6, 2010.

(Continued)

*Primary Examiner* — Lin Ye
*Assistant Examiner* — Euel Cowan
(74) *Attorney, Agent, or Firm* — Nixon Peabody LLP; Jeffrey L. Costellia

(57) ABSTRACT

To provide a drive method for finding out an optimum storage period quickly.
In the method for driving the MOS sensor having a plurality of pixels, after all the plurality of pixels are simultaneously reset, signals are then sequentially outputted from said plurality of pixels. The period from the reset time to the time just before said plurality of pixels output saturated signals is termed as the storage period.

24 Claims, 31 Drawing Sheets

U.S. PATENT DOCUMENTS

| | | | |
|---|---|---|---|
| 6,311,895 B1 * | 11/2001 | Olmstead et al. | 235/462.41 |
| 6,510,202 B2 | 1/2003 | Tamura et al. | |
| 6,515,702 B1 * | 2/2003 | Yadid-Pecht et al. | 348/308 |
| 6,549,234 B1 | 4/2003 | Lee | |
| 6,665,010 B1 * | 12/2003 | Morris et al. | 348/297 |
| 6,859,231 B1 | 2/2005 | Sumi et al. | |
| 6,867,811 B2 | 3/2005 | Nakamura et al. | |
| 6,873,360 B1 | 3/2005 | Kawashiri | |
| 6,879,344 B1 | 4/2005 | Nakamura et al. | |
| 6,980,243 B2 | 12/2005 | Miyawaki et al. | |
| 7,158,183 B1 | 1/2007 | Ohta | |
| 7,787,039 B2 * | 8/2010 | Kimura | 348/310 |
| 2001/0007471 A1 | 7/2001 | Beiley | |

FOREIGN PATENT DOCUMENTS

| | | |
|---|---|---|
| EP | 0 627 847 A2 | 12/1994 |
| JP | 61-265534 A | 11/1986 |
| JP | 62-016684 | 1/1987 |
| JP | 63-161780 | 7/1988 |
| JP | 03-106184 | 5/1991 |
| JP | 05-167775 A | 7/1993 |
| JP | 05-316432 | 11/1993 |
| JP | 06-113206 | 4/1994 |
| JP | 07-050784 | 2/1995 |
| JP | 200-078483 | 3/2000 |
| JP | 2000-076484 | 3/2000 |
| JP | 2001-148807 | 5/2001 |
| JP | 2001-211389 | 8/2001 |
| JP | 2001-230966 | 8/2001 |
| WO | WO 2000/062529 A1 | 10/2000 |
| WO | WO-01/35638 A1 | 5/2001 |
| WO | WO-03/003719 A1 | 1/2003 |

OTHER PUBLICATIONS

"CMOS Image Sensors—Recent Advances and Device Scaling Considerations", IEDM 97: Technical Digest of International Electron Devices Meeting, pp. 201-204.

"CCD for Digital Camera Steered from Exclusive Devotion to Pixel Number to Improvement in Sensitivity", Nikkei Electronics, No. 732, Dec. 14, 1998, pp. 47-52.

"Revised MOS Solid Image Pickup Element—Spreading Its Applications with Arms of Low Power Consumption", Nikkei Electronics, Jul. 14, 1997, pp. 119-124.

"CMOS Image Sensors: Electronic Camera on a Chip", IEDM 95, pp. 7-25.

"Survey of Development of CMOS Camera", JIEC Seminar, Feb. 20, 1998, pp. 1-11.

"Appearance of CCD Directed to Personal Computer Camera", Nikkei Electronics, Apr. 24, 1995, pp. 159-168.

"Solid Image Pickup Element Cameras Having Been Reported These 18 Years", Nikkei Electronics, Sep. 14, 1992, pp. 261-291.

"X-ray Detectors based on Amorphous Silicon Active MATRIX", Euro Display 99, pp. 203-207.

"Amorphous Silicon TFT X-ray Image Sensors", IEDM 98, pp. 21-24.

"Real-time Imaging Flat Panel X-ray Detector", AM-LCD'99, pp. 45-48.

Oba et al. "A ¼ Inch 330k Square Pixel Progressive Scan CMOS Active Pixel Image Sensor", ISSCC 97 (Digest of Technical Papers, 1997 IEEE International Solid-State Circuits Conference), Feb. 1997, pp. 180-181.

"Revised MOS Solid Image Pickup Element—Spreading Its Applications with Arms of Low Power Consumption", Nikkei Electronics, No. 694, Jul. 14, 1997, pp. 119-124.

"Appearance of CCD Directed to Personal Computer Camera", Nikkei Electronics, No. 634, Apr. 24, 1995, pp. 159-168.

"Solid Image Pickup Element Cameras Having Been Reported These 18 Years", Nikkei Electronics, No. 563, Sep. 14, 1992, pp. 261-291.

Oba et al. "A ¼ Inch 330k Square Pixel Progressive Scan CMOS Active Pixel Image Sensor", ISSCC 97 (Digest of Technical Papers, 1997 IEEE International Solid-State Circuits Conference), vol. 40, Feb. 1997, pp. 180-181.

* cited by examiner

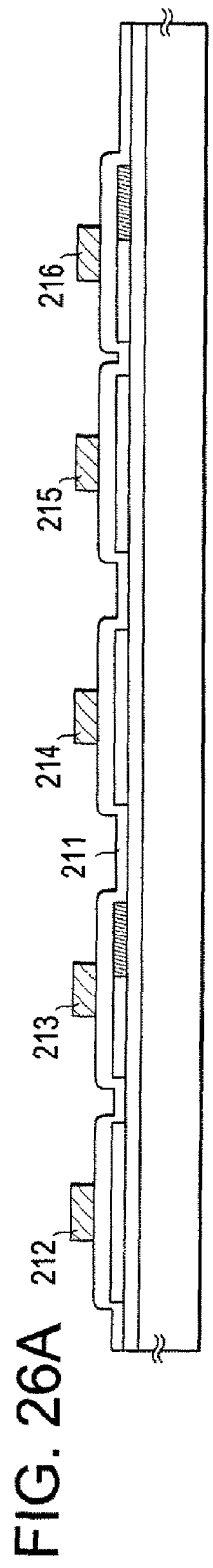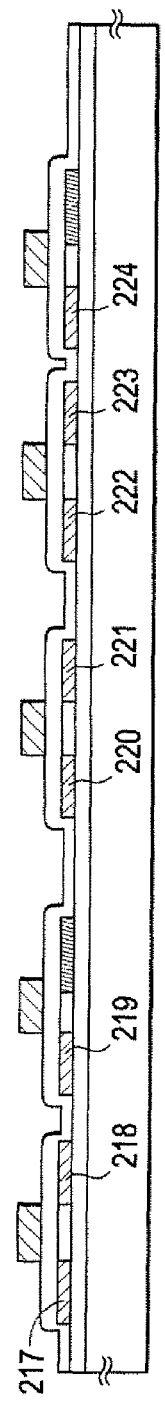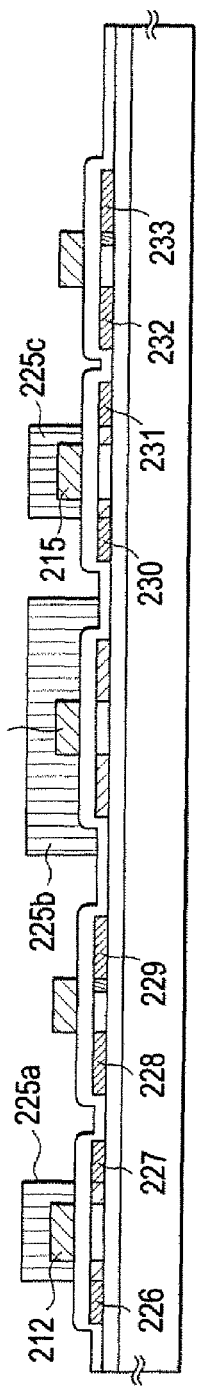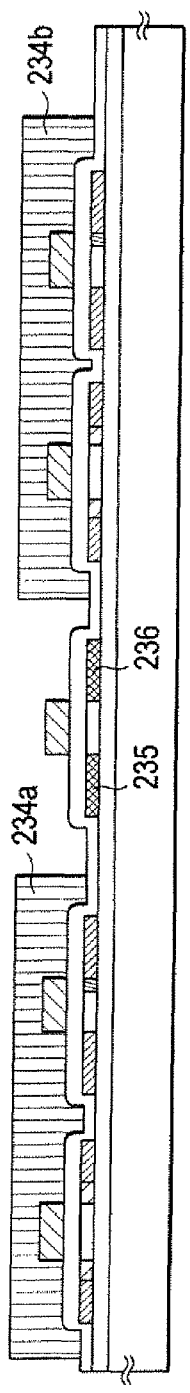

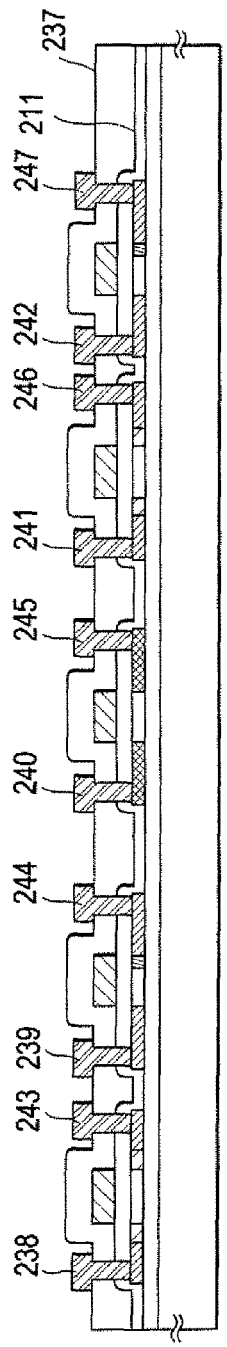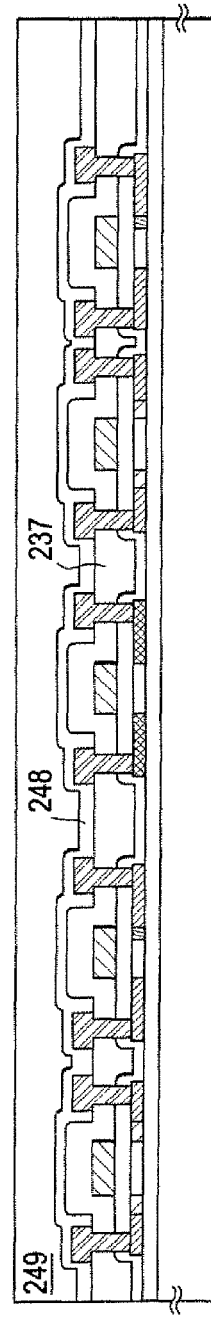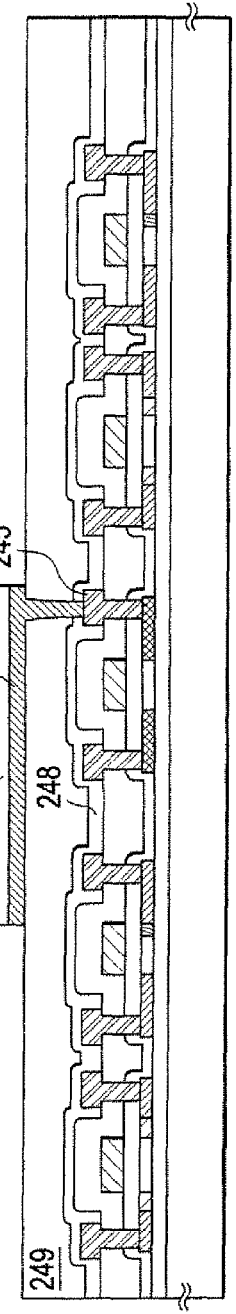
FIG. 27A
FIG. 27B
FIG. 27C

MOS SENSOR AND DRIVE METHOD THEREOF

BACKGROUND OF THE INVENTION

1. Field of the Invention

The present invention relates to a MOS sensor and its drive method. More specifically, the invention relates to a technique for determining the optimum storage period in a MOS area sensor.

2. Related Art

In recent years, information devices such as the personal computers have spread so widely as to enhance the desire to read various informations as electronic informations in the personal computers. Therefore, the digital still cameras have been highly noted in place of the silver salt cameras of the prior art, and the scanners have also been highly noted as the means for reading prints from paper.

In the digital still cameras, there has been used the area sensor in which the pixels of an image sensor unit are two-dimensionally arrayed. In the scanners or copying machines, there has been used the line sensor in which the pixels of the image sensor unit is linearly arrayed.

In these image reading devices, the CCD sensor is mainly used as the image sensor. In the CCD sensor, the photodiode of each pixel performs the photoelectric conversion, and its signal is read by using the CCD. In the recent years, however, the MOS sensor made of a single-crystalline silicon substrate has shown the symptom of partial spreading because a peripheral circuit can be built in, it can be made into one chip, it is suitable for the real time signal processing, and its power consumption is low, and so on. These spreading situations of the MOS sensor have been described on pp. 119 of "Nikkei Electronics", Jul. 14, 1997 (Revived MOS Solid Image•Pickup Element—Spreading Its Applications with Arms of Low Power Consumption). At the research level, however, there has also been developed the MOS sensor which is made of TFTs over a glass substrate. In these MOS sensors, the signals of individual pixels are read out by the photoelectric conversions through the photodiodes of each pixel and by the switches formed of the MOS transistors.

First of all, therefore, here will be schematically described the MOS sensor, followed by the CCD sensor.

As the pixel construction of the MOS sensor, there have been developed a variety of types. These types can be coarsely classified into two kinds: a passive sensor and an active sensor. The passive sensor is a sensor having no signal amplifying element on each pixel, whereas the active sensor is a sensor having a signal amplifying element on each pixel. The active sensor has a merit of a higher strength against noises than the passive sensor because the signal is amplified in each pixel.

FIG. 3 shows a circuit example of a pixel in the passive sensor. The pixel 305 is constructed to include a switching transistor 301 and a photodiode 304. This photodiode 304 is connected with a power reference line 306 and the source terminal of the switching transistor 301. The switching transistor 301 is connected at its gate terminal with a gate signal line 302 and at its drain terminal with a signal output line 303. The photodiode 304 performs the photoelectric conversion. Specifically, the photodiode 304 generates an electric charge according to an incident light and stores it therein. By controlling the gate signal line 302, moreover, the switching transistor 301 is turned conductive so that the electric charge of the photodiode 304 is read out via the signal output line 303.

In the passive sensor, the switching transistor 301 is turned conductive to read the charge of the photodiode 304 as the signal. Moreover, the photodiode 304 is connected with the source terminal of the switching transistor 301. When the signal is read, therefore, the photodiode 304 changes its state (e.g., the charge or the potential). In other words, the signal of the photodiode 304 cannot be read without changing its state. Therefore, it can be said that the reading by the passive sensor is a destructive one.

Also, it is ordinary that the signal of the pixel is read and outputted for each row or pixel. On the other hand, the storage period has to be equal for all pixels. It is, therefore, necessary to perform the resetting for each row or pixel. As a result, the timings for the resetting and the signal outputting are different for the individual rows (or pixels). Therefore, the storage periods are equal for all rows, but the storage timings are not. With these restrictions, however, the signals of the individual rows (or pixels) can be randomly read out on principle. Therefore, this reading method is called the "random reset/read method".

There are a variety of types of constructions of the pixels of the active sensor. On pp. 17 (CMOS Image Sensors, Electronic Camera On a Chip) of IEDM95 or on pp. 201 (CMOS Image Sensors—Recent Advances and Device Scaling Considerations) of IEDM97, there are introduced the pixel constructions and actions of photo diode type and photo gate type. On pp. 180 (A ¼ Inch 330 k Square Pixel Progressive Scan CMOS Active Pixel Image Sensor) of ISSCC97, the pixel construction is classified from the viewpoint of a pixel selecting method. Specifically, there are described the case of using transistors and the case of using capacitors. Thus, there are various numbers of transistors which construct one pixel. In JIEC Seminar: Survey of Development of CMOS Cameras of Feb. 20, 1998, there has been widely introduced the general view of the CMOS sensors, and there has also been described the logarithmic conversion type for outputting logarithmic signals of the optical intensity by connecting the gate electrodes and the drain electrodes of resetting transistors.

The pixel construction of the active sensor, as most frequently adopted, is of the type in which one pixel 408 is composed of three N-channel transistors and one photodiode, as shown in FIG. 4. A photodiode 404 is connected at its P-channel terminal with a power reference line 412 and at its N-channel terminal with the gate terminal of an amplifying transistor 406. The drain terminal and the source terminal of the amplifying transistor 406 are connected with a power line 409 and the drain terminal of a switching transistor 401. This switching transistor 401 is connected at its gate terminal with a gate signal line 402 and at its source terminal with a signal output line 403. A resetting transistor 407 is connected at its gate terminal with a reset signal line 405. The source terminal and the drain terminal of the resetting transistor 407 are connected with the power line 409 and the gate terminal of the amplifying transistor 406.

In the case of the area sensor, one signal output line 403 is connected with not only one pixel 408 but also many pixels. However, only one biasing transistor 411 is arranged for one signal output line 403. The biasing transistor 411 is connected at its gate terminal with a bias signal line 410. The source terminal and the drain terminal of the biasing transistor 411 are connected with the signal output line 403 and a bias side power line 413.

Here will be described the basic actions of the pixel 408.

At first, the resetting transistor 407 is turned conductive. The photodiode 404 is electrically connected at its P-channel terminal with the power reference line 412 and at its N-channel terminal with the power line 409. The power reference line 412 has a potential at the reference potential of 0 V, and the power line 409 has a potential at a power potential Vdd. Therefore, a reverse bias voltage is applied to the photodiode 404. From now on, the action, in which the potential of the N-channel terminal of the photodiode 404 is charged to the potential of the power line 409, will be called the "reset". After this, the resetting transistor 407 is turned nonconductive. Then, an electric charge is generated by the photoelectric conversion when the photodiode 404 is irradiated with light. As the time elapses, therefore, the potential, as charged to the potential of the power line 409, at the N-channel terminal of the photodiode 404 is gradually lowered due to the charge generated by the light. After a lapse of a predetermined time, moreover, the switching transistor 401 is turned conductive. Then, the signal is outputted through the amplifying transistor 406 to the signal output line 403.

When the signal is outputted, however, the potential is applied to the bias signal line 410 so that the electric current flows in the biasing transistor 411. Therefore, the amplifying transistor 406 and the biasing transistor 411 act as the so-called "source-follower circuit".

In FIG. 4, the wiring line connecting the P-channel terminal of the photodiode 404, i.e., the power reference line 412 may be called the "photoelectric conversion element side power line". The potential of this photoelectric conversion element side power line changes with the direction of the photodiode 404. In FIG. 4, the photoelectric conversion element side power line is connected with the P-channel terminal of the photodiode 404 and has the reference potential of 0 V. In FIG. 4, therefore, the photoelectric conversion element side power line is called the "power reference line".

Likewise, in FIG. 4, the wiring line connecting the resetting transistor 407, i.e., the power line 409 may be called the "reset side power line". The potential of this reset side power line changes with the direction of the photodiode 404. In FIG. 4, the reset side power line is connected through the resetting transistor 407 with the N-channel terminal of the photodiode 404 so that it has the power potential Vdd. In FIG. 4, therefore, the reset side power line is called the "power line".

To reset the photodiode 404 is to apply the reverse bias voltage to the photodiode 404. According to the direction of the photodiode 404, therefore, there changes the magnitude relation of the potential between the photoelectric conversion element side power line and the reset side power line.

Next, FIG. 5 shows an example of the most basic source follower circuit. In FIG. 5, there is shown the case in which the N-channel transistor is used. The source follower circuit could be constructed by using the P-channel transistor. An amplification side power line 503 is fed with the power potential Vdd. A bias side power line 504 is fed with the reference potential of 0 V. An amplifying transistor 501 is connected at its drain terminal with the amplification side power line 503 and at its source terminal with the drain terminal of a biasing transistor 502. The source terminal of the biasing transistor 502 is connected with the bias side power line 504. The biasing transistor 502 is fed at its gate terminal with a bias potential Vb. Therefore, a bias current Ib flows into the biasing transistor 502. The biasing transistor 502 basically acts as a constant current source. The gate terminal of the amplifying transistor 501 acts as an input terminal 506. Therefore, the amplifying transistor 501 is fed at its gate terminal with an input potential Vin. The source terminal of the amplifying transistor 501 acts as an output terminal 507. Therefore, the source terminal of the amplifying transistor 501 takes an output potential Vout. The input/output relation of the source follower circuit at this time is Vout=Vin−Vb.

Comparing FIG. 4 and FIG. 5, the amplifying transistor 406 corresponds to the amplifying transistor 501. The biasing transistor 411 corresponds to the biasing transistor 502. It can be thought that the switching transistor 401 is omitted from FIG. 5, because the conductive state is imagined. The potential at the N-channel terminal of the photodiode 404 corresponds to the input potential Vin (i.e., the gate potential of the amplifying transistor 501 or the potential at the input terminal 506). The potential at the signal output line 403 corresponds to the output potential Vout (i.e., the source potential of the amplifying transistor 501 or the potential at the output terminal 507). The power line 409 corresponds to the amplification side power line 503.

In FIG. 4, therefore, a relation of Vout=Vpd−Vb is deduced by setting the potential at the N-channel terminal of the photodiode 404 to Vpd, by setting the potential of the bias signal line 410, i.e., the bias potential to Vb, by setting the potential of the signal output line 403 to Vout and by setting the potentials of the power reference line 412 and the biasing power line 413 to 0 V. When the potential Vpd at the N-channel terminal of the photodiode 404 changes, therefore, the potential Vout also changes so that the change in the potential Vpd can be read as the signal to read the optical intensity.

Next, the signal timing chart at the pixel 409 is illustrated in FIG. 6. At first, the resetting transistor 407 is turned conductive by controlling the reset signal line 405. Then, the potential at the N-channel terminal of the photodiode 404 is charged up to the power potential Vdd or the potential of the power line 409. In short, the pixel is reset. Then, the reset signal line 405 is controlled to turn the resetting transistor 407 nonconductive. After this, the photodiode 404 generates the electric charges according to an optical intensity if irradiated with light. Therefore, the electric charge stored by the resetting action is gradually released. In other words, the potential at the N-channel terminal of the photodiode 404 becomes lower. Where a dark light is irradiating, the discharging rate is also low so that the potential at the N-channel terminal of the photodiode 404 does not become so low. Where a bright light is irradiating, the discharging rate is so high that the potential at the N-channel terminal of the photodiode 404 drops at a high changing rate.

At an instant of time, the switching transistor 401 is turned conductive to read the potential at the N-channel terminal of the photodiode 404 as the signal. This signal is proportional to the intensity of the light. Then, similar actions are repeated by turning the resetting transistor 407 conductive again to reset the photodiode 404.

Where a very bright light is irradiating, however, the electric charge of the photodiode 404 is released so much that the potential at the N-channel terminal of the photodiode 404 becomes to a very low level. However, the potential at the N-channel terminal of the photodiode 404 does not become lower than the potential at the P-channel terminal of the photodiode 404, i.e., the potential of the power reference line 412. When an intense light irradiates, therefore, the potential at the N-channel terminal of the photodiode 404 becomes low. When this potential becomes lower and lower down to the potential of the power reference line 412, it does not change any more. This situation is called the "saturation". In this saturation, the potential at the N-channel terminal of the photodiode 404 does not change so that the correct signal, i.e., the signal according to the optical intensity cannot be outputted. Within the normal action range, therefore, it is necessary to prevent the photodiode 404 from being saturated.

Here, the period from the time when the pixel is reset to the time when the signal is outputted is called the "storage period". In short, the storage period is the time period, for which the signal is being stored by irradiating the light receiving unit of an image sensor with the light, and is called the "storage term" or the "exposure period". For the storage period, the photodiode 404 is storing the electric charge generated by the light. For the different storage periods, therefore, the totals of the electric charges, as generated with the light, are different even for an identical light intensity, so that the signal values become different. For example, a bright light causes a saturation for a short storage period. Even a dark light will cause a saturation if the storage period is long. In short, the signal is determined by the product of the optical intensity and the storage period.

FIG. 6 illustrates the case of one pixel. Here will be described the case in which the pixels are arrayed in a matrix shape. In this case, the signals of the pixels are read out as outputs for each row. On the other hand, the storage period has to be equal for all pixels. Therefore, the resetting has to be done for each row. As a result, the timing for the resetting and the timing for outputting the signals are different for the individual rows. Therefore, the storage period is equal for the pixels of all rows, but the storage times are different. With these restrictions, however, the signals of the individual rows can be read out at random. Therefore, the reading method of this case is the random reset/read method.

In the pixel 408, on the other hand, the switching transistor 401 is turned conductive to read the signal from the photodiode 404. However, the N-channel terminal of the photodiode 404 is connected with the gate terminal of the amplifying transistor 406. Even if the signal is read, therefore, no change occurs in the state (e.g., the charge or potential) of the photodiode 404. In other words, the signal of the photodiode 404 can be read many times without changing the state of the photodiode 404. Therefore, it can be said that the reading in the active sensor is a non-destructive reading.

Here will be described the transistors in the pixel 408. On the polarity, the transistors are frequently of the N-channel type. It is rare, but the resetting transistor is of the P-channel type (as should be referred to FIG. 11 of pp. 9 of JIEC Seminar: Survey of Development of CMOS Cameras, Feb. 20, 1998). On the other hand, the amplifying transistor and the selecting transistor, which are both N-channel types, are frequently arranged, as shown in FIG. 4, by connecting the power line 409 and the amplifying transistor 406, by connecting the amplifying transistor 406 and the switching transistor 401, and by connecting the switching transistor 401 and the signal output line 403. The arrangement is rarely effected by using both the transistors of the N-channel type to connect the power line 409 and the switching transistor 401, the switching transistor 401 and the amplifying transistor 406, and the amplifying transistor 406 and the signal output line 403 (on pp. 180 of ISSCC97: A ¼ Inch 330 k Square Pixel Progressive Scan CMOS Active Pixel Image Sensor).

The MOS sensor has been described hereinbefore. Here will be described CCD sensor.

At first, the CCD sensor can be coarsely classified into two in accordance with the signal transfer method in the CCD. One is the frame transfer type CCD, and the other is the interline transfer type CCD. Basically, both the CCDs act in the bucket relay method. Specifically, a signal is transferred to an adjoining pixel, and another signal is received from another adjoining pixel. These actions are repeated. These actions are made for all pixels and are repeated to transfer the whole signals. Only a signal of a certain pixel cannot be read by itself but is transferred to an adjoining pixel at all times.

The frame transfer CCD shares the light receiving unit and the signal transferring unit. In the actions, the light receiving unit performs the photoelectric conversion to store the electric charge and transfers the signal to an adjoining light receiving unit (i.e., transfers a signal to an adjoining pixel and receives another signal from another adjoining pixel). In this method, an electric charge is mixed, if generated by a new light while the signal is being transferred, into the signal being transferred. This makes it necessary to shut the light while the signal being transferred. Therefore, a mechanical shutter is used to shut the light.

In the interline transfer CCD, the transfer CCD is arranged separately from the light receiving unit. The action is to transfer the signals, which are stored in the light receiving unit, all at once to the transfer CCD. After this, the transfer CCD transfers the signals (i.e., transfers a signal to an adjoining pixel and receives another signal from another adjoining pixel). The interline transfer CCD is shut from the light, and the light receiving unit and the CCD unit are separated. Even if the light is produced in the light receiving unit while the signal is being transferred, therefore, it is not mixed into the signal being transferred. Therefore, no problem arises even if the light is irradiating while the signal is being transferred.

The timing of the resetting of the CCD sensor is different from that of the case of the MOS sensor. In the case of the MOS sensor, the signals are read out one by one or row by row from the pixels so that the resetting is done one by one or row by row. In the CCD sensor, on the other hand, the reading is started all at once from all pixels. In order to equalize the storage periods, therefore, it is necessary to reset the pixels all at once. As a result, all the pixels are reset simultaneously and the singles are outputted from all the pixels simultaneously. Therefore, the storage periods are equal for all pixels, and the storage times are identical. Thus in the CCD sensor, the pixels are reset all at once and are read all at once. Therefore, this reading method is called the batch reset/read method.

In the CCD sensor, on the other hand, the electric charge, as stored by the light receiving unit, is transferred. After the signal has been once read, the state (i.e., the charge or potential) of the light receiving unit changes. In other words, the signal of the light receiving unit cannot be read without changing the state of the light receiving unit. Therefore, it can be said that the reading in the CCD sensor is a destructive reading.

On pp. 47 (CCD for Digital Camera Steered from Exclusive Devotion to Pixel Number to Improvement in Sensitivity) of Nikkei Electronics (No. 732), Dec. 14, 1998, and on pp. 159 (Appearance of CCD Directed to Personal Computer Camera) of Nikkei Electronics (No. 634), Apr. 24, 1995, there is introduced the method of the CCD sensor. On pp. 261 of Nikkei Electronics (Solid Image Pickup Element Cameras Having Been Reported These 18 Years) of Nikkei Electronics, Sep. 14, 1992, there have been introduced differences between the MOS sensor and the CCD sensor.

Here will be described the sensor unit for the photoelectric conversion. The CCD sensor and the MOS sensor have no special difference in the sensor unit. Usually, a PN type photodiode is used to convert a light into electricity. The sensor unit is further exemplified by a PIN type diode, an avalanche diode, an npn buried type diode or a Schottky diode. Another sensor unit may be a photoconductor for an X-ray or a sensor for an infrared ray. This sensor unit is described in "Fundamentals of Solid Image Pickup Element—Device of Electronic Eyes" of Nippon Rikoh Shuppankai written by Takao Ando and Hirohito Komofuchi.

Here will be described appliances suited for the sensor. This sensor is used not only in the ordinary digital still camera or scanner but also in the X-ray camera. This camera may use a photoconductor for converting the X-ray directly into electric signals or may read the light which has been converted from the X-ray by a fluorescent material or a scintillator. On pp. 203 of Euro Display 99 (X-ray Detectors based on Amorphous Silicon Active Matrix), there has been described the case in which the X-ray is converted into the light by the scintillator and the light is read out. On pp. 21 of IEDM 98 (Amorphous Silicon TFT X-ray Image Sensors), it has been reported that the light is read by means of amorphous silicon. On pp. 45 of AM-LCD99 (Real-Time Imaging Flat Panel X-ray Detector), it has been reported that the light is read by means of the photoconductor.

Next, it will be considered what range the optical intensity of an image falls under when the object is to be read by using the CCD or MOS image sensor.

In the first case of the digital still camera, the optical intensity of the object ranges from the black state to such a bright state as experienced by observing the sun directly. Thus, the optical intensity of the object can take a range from 0 to infinity. Therefore, the image sensor to be employed here is required to have a wide dynamic range for the incident light. As a matter of fact, however, the image sensor has a limited dynamic range so that the imaging has to be done for a standard object illuminance. If the object illuminance is improper, a flash is frequently used. Alternatively, the shutter is used to adjust the exposure time. The shutter of the digital still camera has two kinds: mechanical shutter and an electronic shutter. The mechanical shutter shuts the optical slit mechanically as in the case of the silver salt camera. The electronic shutter changes the storage period by adjusting the drive signal of the image sensor.

On the other hand, the scanner is mostly prepared with a dedicated light source. Even if the object had a reflectivity of 100%, therefore, the range of the intensity of the light to enter the image sensor is known in advance. In other words, a more intense light than that of the dedicated light source will not enter. Thus, the storage period may be so set that the output signal may be saturated where the reflectivity is the highest (as usually experienced by the white paper).

The potential at the N-channel terminal of the photodiode 404 hardly changes, when the optical intensity is low, but highly changes when the intensity is high. Where the optical intensity is extremely high, however, the potential at the N-channel terminal of the photodiode 404 drops as low as the potential at the P-channel terminal of the photodiode 404 and may be saturated. The potential at the N-channel terminal of the photodiode 404 does not change any more, if saturated, so that the image cannot be correctly read. Even in the high optical intensity, therefore, the storage period has to be so shortened for adjustment as to prevent the saturation.

If the storage period is excessively shortened, however, it may end although the potential at the N-channel terminal of the photodiode 404 changes a little. In this case, the signal amplitude is reduced to degrade the image quality.

It is, therefore, desired to prevent the saturation and to enlarge the signal amplitude even where the optical intensity is high. This desire can be satisfied if the storage period is so adjusted that the signal to be outputted may take a value just before the saturation. It is found from the description thus far made that the optimization of the storage period is important.

It is, therefore, assumed that the image is taken for examining the optimum storage period. This image pickup will be called the "trial imaging".

In the case of the CCD sensor, the reading method is the batch reset/read method, by which the signals are transferred as if they were relayed in buckets. This method makes it impossible to reset or to read out the signals for every pixels. In other words, it is impossible to use the random reset/read method. Where the signals of one frame are read, therefore, the storage periods of all pixels are equalized. In one image pickup, the storage periods cannot be changed for every pixels. Because of the destructive reading, on the other hand, the image pickup has to be done over again after one trial.

It is assumed in the situations described above that the trial imaging is done by setting the storage period to a value and by reading the signals of one frame. In this case, however, the signals may have been saturated already. Then, the trial imaging has to be redone. Moreover, it is necessary to set the tentative storage period again. In this case, however, it is unknown what value the tentative storage period has to be set to. What is known is that the tentative storage period may be shorter than the storage period at the time of the first trial imaging. If the storage period is shorter, the signal amplitude may be so small that it cannot be correctly read out. If the storage period is still longer, the trial imaging has to be done once more.

Here will be illustrated an example of the case described above. FIG. 7 illustrates a change in the potential at the N-channel terminal of the photodiode after reset. Since the period just before the saturation is the optimum storage period, it is found from FIG. 7 that the storage period is optimum at the period 10 till the reading.

In order to find out the optimum period, a first trial imaging is done. Since the optimum storage period is absolutely unknown at this time, it is assumed that the trial imaging is done for a storage period of 20. At this time, however, it is found from FIG. 7 that the saturation has been already completed. Therefore, a second trial imaging is done for a storage period of 15. However, the saturation has been still completed. Therefore, a third trial imaging is done over again for a storage period of 8. Then, the saturation is not completed so that the signal value according to the optical intensity is outputted. The storage period is analogized from the signal value at this time.

In this example, the trial imaging is done three times. The time period necessary for the trial imaging is as long as 20+15+8=43, as shown in FIG. 8.

Thus, for the CCD sensor, it is seriously difficult to find out the optimum storage period.

Thus, there has been described the storage period for preventing the signals from being saturated. Here will be described the difficulty for the signals to be precisely read where the object to be imaged has close graduations (or brightnesses).

FIG. 9 shows a signal timing chart at the pixel 409. At first, the resetting transistor 407 is turned conductive by controlling the reset signal line 405. Then, the potential at the N-channel terminal of the photodiode 404 is charged to the power potential Vdd or the potential of the power line 409 so that the pixel is reset. Then, the resetting transistor 407 is turned nonconductive by controlling the reset signal line 405. After this, the potential at the N-channel terminal of the photodiode 404 becomes lower if the photodiode 404 is irradiated with a light. Where the photodiode 404 is irradiated with a dark light, the amount of the discharge is so little that the potential at the N-channel terminal of the photodiode 404 does not become so low. Where photodiode 404 is irradiated with the bright light, the amount of the discharge is so much that the potential at the N-channel terminal of the photodiode 404 becomes extremely low.

At a point of time, moreover, the potential at the N-channel terminal of the photodiode 404 is read out as the signal by turning the switching transistor 401 conductive.

Here, it is assumed that the photodiode 404 is irradiated with lights of similar intensities. The potentials at the N-channel terminal of the photodiode 404 in this case are so close, as illustrated in FIG. 9. Therefore, it is made difficult by the influences of noises or dispersions to detect the potential difference.

SUMMARY OF THE INVENTION

The invention has an object to solve the above-specified problems of the prior art.

The CCD sensor cannot perform the random reset/read. Therefore, here will be described the MOS sensor. This MOS sensor can perform the random reset/read.

In the invention, by making use of the possibility of the random reset/read, there is performed the trial imaging in which the signal is outputted by changing the storage period of each pixel. It is then decided from the signal amplitude whether or not the pixel is just before saturated. Moreover, the storage period just before the saturation is assumed to be optimum.

By performing this trial imaging, it is possible to find out the optimum storage period for a short time. If the ordinary imaging is done by setting the optimum storage period, moreover, the signal is not saturated so that the signal amplitude according to the optical intensity can be obtained. Because of the large signal amplitude, on the other hand, the performance of the sensor is improved.

Here, the "ordinary imaging" is to read out the image to be imaged. By this ordinary imaging, the image informations can be read out.

The method for outputting the signals from the pixels by changing the storage period is performed as follows. At first, all pixels of the MOS sensor are reset all at once. After this, the signals are read out for each pixel or row. Then, the storage periods of the signals to be outputted are so different for the pixels that they increase pixel by pixel or row by row. This is because the storage period is one from the reset time to the output of the signal from the pixel and because the storage period becomes gradually longer if all pixels are reset all at once and if the signals are then sequentially outputted.

If the signals are then read out after all pixels of the MOS sensor were reset all at once, the output signal amplitude changes for each storage period. Moreover, the output signal value does not change after the saturation. At this stage, the storage period at the saturation is known so that the value of the storage period just before the saturation can be found out. And, this value may be used as the optimum storage period.

Here will be described the constructions of the invention.

According to the invention, there is provided a method for driving a MOS sensor having a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the pixels of said image pickup unit are sequentially selected, after all the plurality of the pixels reset simultaneously, so that the signals of the selected pixels are outputted.

According to the invention, there is provided a method for driving a MOS sensor having a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the pixels of said image pickup unit are sequentially selected, after all the plurality of the pixels reset simultaneously, so that the signals of the selected pixels are outputted, and whereby the period from said reset time to the time when the signals of said selected pixels are saturated is set to the value of a storage period.

According to the invention, there is provided a method for driving a MOS sensor having a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the plurality of pixels of said image pickup unit are sequentially selected, after all reset simultaneously, so that the signals of the selected pixels are outputted, and whereby the period from said reset time to the time when the signal having the largest amplitude of said selected pixels is saturated is set to the value of a storage period.

According to the invention, there is provided a method for driving a MOS sensor having a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the pixels of said image pickup unit are sequentially selected, after all the plurality of the pixels reset simultaneously, so that the signals of the selected pixels are outputted, and whereby the period from said reset time to the time when the photoelectric conversion elements of said selected pixels are saturated is set to the value of a storage period.

According to the invention, there is provided a method for driving a MOS sensor having a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the plurality of pixels of said image pickup unit are sequentially selected, after all reset simultaneously, so that the signals of the selected pixels are outputted, and whereby the period from said reset time to the time when any one of the photoelectric conversion elements of said selected pixels is saturated is set to the value of a storage period.

According to the invention, there is provided a MOS sensor driving method, wherein the value of said storage period is set by irradiating said image pickup unit with that of the highest intensity of the lights which have been reflected by an object to enter said image pickup unit.

According to the invention, there is provided a MOS sensor driving method, wherein the signals are outputted exclusively from those of the plurality of pixels of said image pickup unit that belong to a limited area.

According to the invention, there is provided a MOS sensor driving method, wherein the image of an object is picked up by using said storage period.

According to the invention, there is provided a MOS sensor comprising a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the pixels of said image pickup unit are sequentially selected, after all the plurality of the pixels reset simultaneously, so that the signals of the selected pixels are outputted.

According to the invention, there is provided a MOS sensor, wherein the signals are outputted exclusively from those of the plurality of pixels of said image pickup unit that belong to a limited area.

According to the invention, there is provided a MOS sensor comprising a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the pixels of said image pickup unit are sequentially selected, after all the plurality of the pixels reset simultaneously, so that the signals of the selected pixels are outputted, and whereby the period from said reset time to the time when the signals of said selected pixels are saturated is set to the value of a storage period.

According to the invention, there is provided a MOS sensor comprising a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the plurality of pixels of said image pickup unit are sequentially selected, after all reset simultaneously, so that the signals of the selected pixels are outputted, and whereby the period from said reset time to the time when the signal having the largest amplitude of said selected pixels is saturated is set to the value of a storage period.

According to the invention, there is provided a MOS sensor comprising a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the pixels of said image pickup unit are sequentially selected, after all the plurality of the pixels reset simultaneously, so that the signals of the selected pixels are outputted, and whereby the period from said reset time to the time when the photoelectric conversion elements of said selected pixels are saturated is set to the value of a storage period.

According to the invention, there is provided a MOS sensor comprising a plurality of pixels in an image pickup unit, wherein said pixel includes a photoelectric conversion element, a resetting transistor and a signal amplifier circuit, wherein said photoelectric conversion element is connected at its one terminal with the source terminal or drain terminal of said resetting transistor and at its other terminal with a photoelectric conversion element side power line, wherein said resetting transistor is connected at its gate terminal with a reset signal line, and wherein said resetting transistor is connected at its source terminal or drain terminal with said photoelectric conversion element and the input terminal of said signal amplifier circuit and at its other with a reset side power line, whereby the plurality of pixels of said image pickup unit are sequentially selected, after all reset simultaneously, so that the signals of the selected pixels are outputted, and whereby the period from said reset time to the time when any one of the photoelectric conversion elements of said selected pixels is saturated is set to the value of a storage period.

According to the invention, there is provided a MOS sensor, wherein the value of said storage period is set by irradiating said image pickup unit with that of the highest intensity of the lights which have been reflected by an object to enter said image pickup unit.

According to the invention, there is provided a MOS sensor, wherein the signals are outputted exclusively from those of the plurality of pixels of said image pickup unit that belong to a limited area.

According to the invention, there is provided a MOS sensor, wherein the image of an object is picked up by using said storage period.

BRIEF DESCRIPTION OF THE DRAWINGS

FIGS. 26A to 26D are diagrams showing the process for manufacturing the image sensor of the invention;

FIGS. 27A to 27C are diagrams showing the process for manufacturing the image sensor of the invention;

DESCRIPTION OF THE PREFERRED EMBODIMENTS

Figure 1:
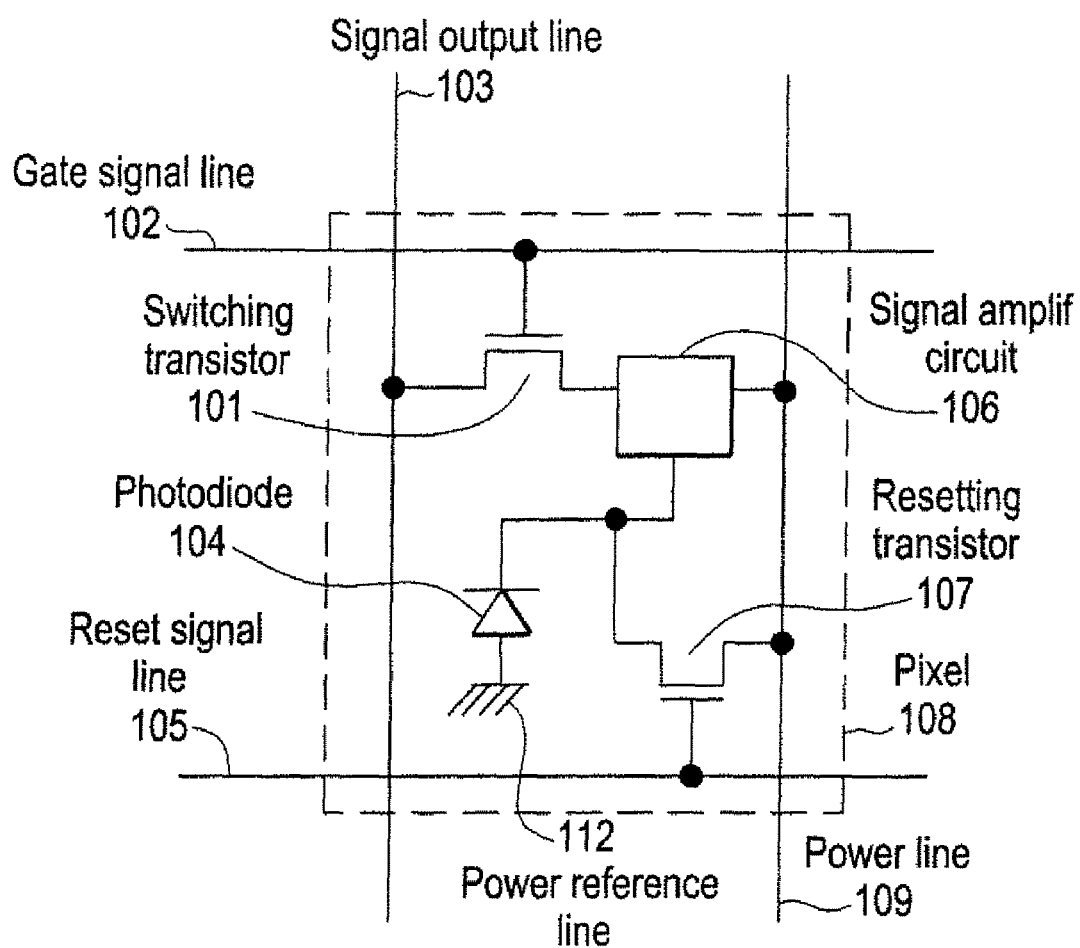
FIG. 1 is a circuit diagram of a MOS sensor of the invention.

FIG. 1 shows one example of a pixel circuit diagram of a MOS active sensor. A photodiode 104 is connected at its P-channel terminal with a power reference line 112 and at its N-channel terminal with the input terminal of a signal amplifier circuit 106. The output terminal and the power supply terminal of the signal amplifier 106 are connected with a power line 109 and the drain terminal of a switching transistor 101. This switching transistor 101 is connected at its gate terminal with a gate signal line 102 and at its source terminal with a signal output line 103. A resetting transistor 107 is connected at its gate terminal with a reset signal line 105. The source terminal and the drain terminal of the resetting transistor 107 are connected with the power line 109 and the input terminal of the signal amplifier circuit 106.

Here, the switching transistor 101 and the resetting transistor 107 may take either the P-channel or the N-channel.

Here, the signal amplifier circuit 106 is frequently composed of one transistor. However, the signal amplifier circuit 106 may be composed of a plurality of transistors or capacitors as of the photo-gate type.

The basic actions are as follows. At first, when the reset signal line 105 turns conductive, the photodiode 104 is reset. When the gate signal line 102 then turns conductive, the signal of the photodiode 104 is outputted to the signal output line 103.

Figure 2:
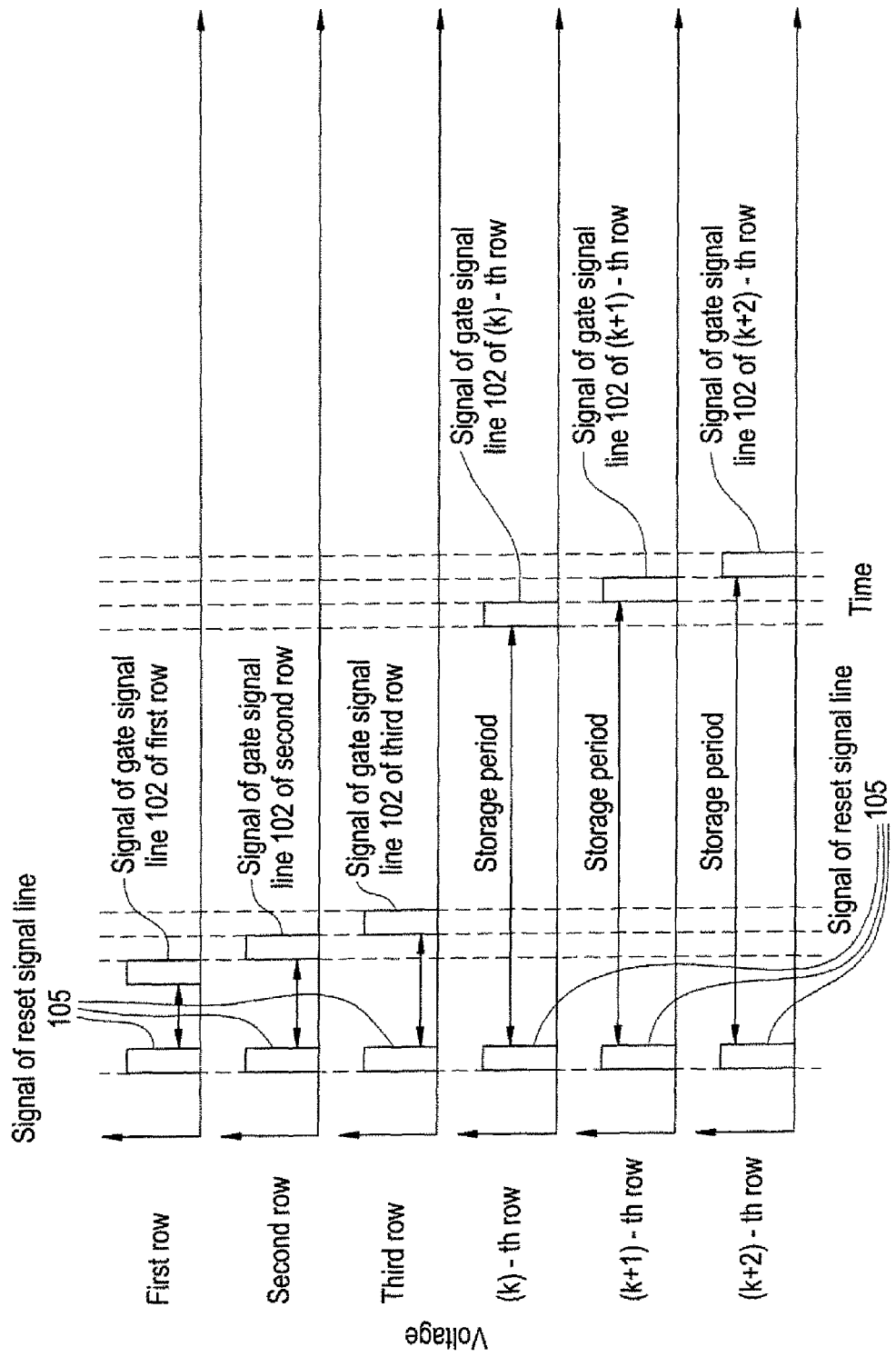
FIG. 2 is a timing chart of the MOS sensor of the invention.
Figure 3:
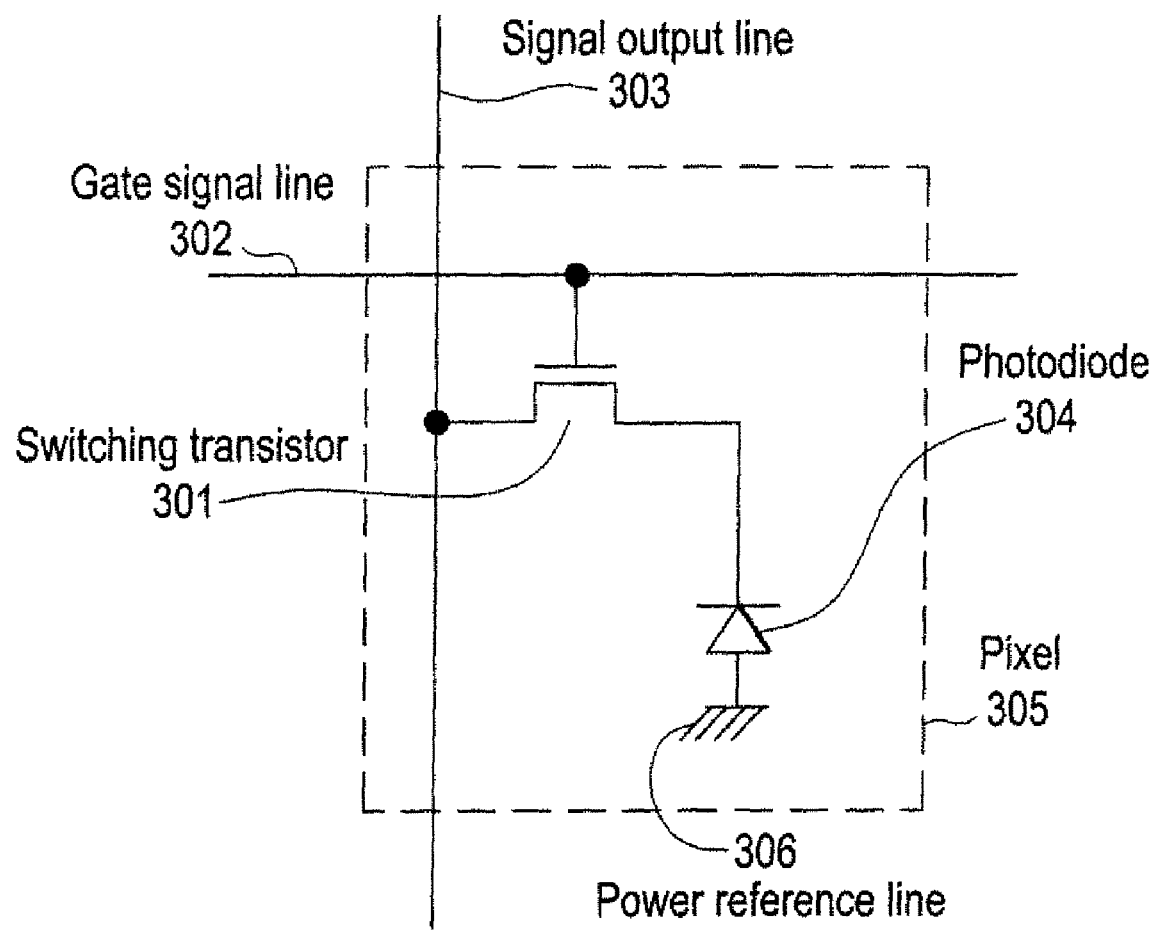
FIG. 3 is a circuit diagram of the passive sensor of the prior art.
Figure 4:
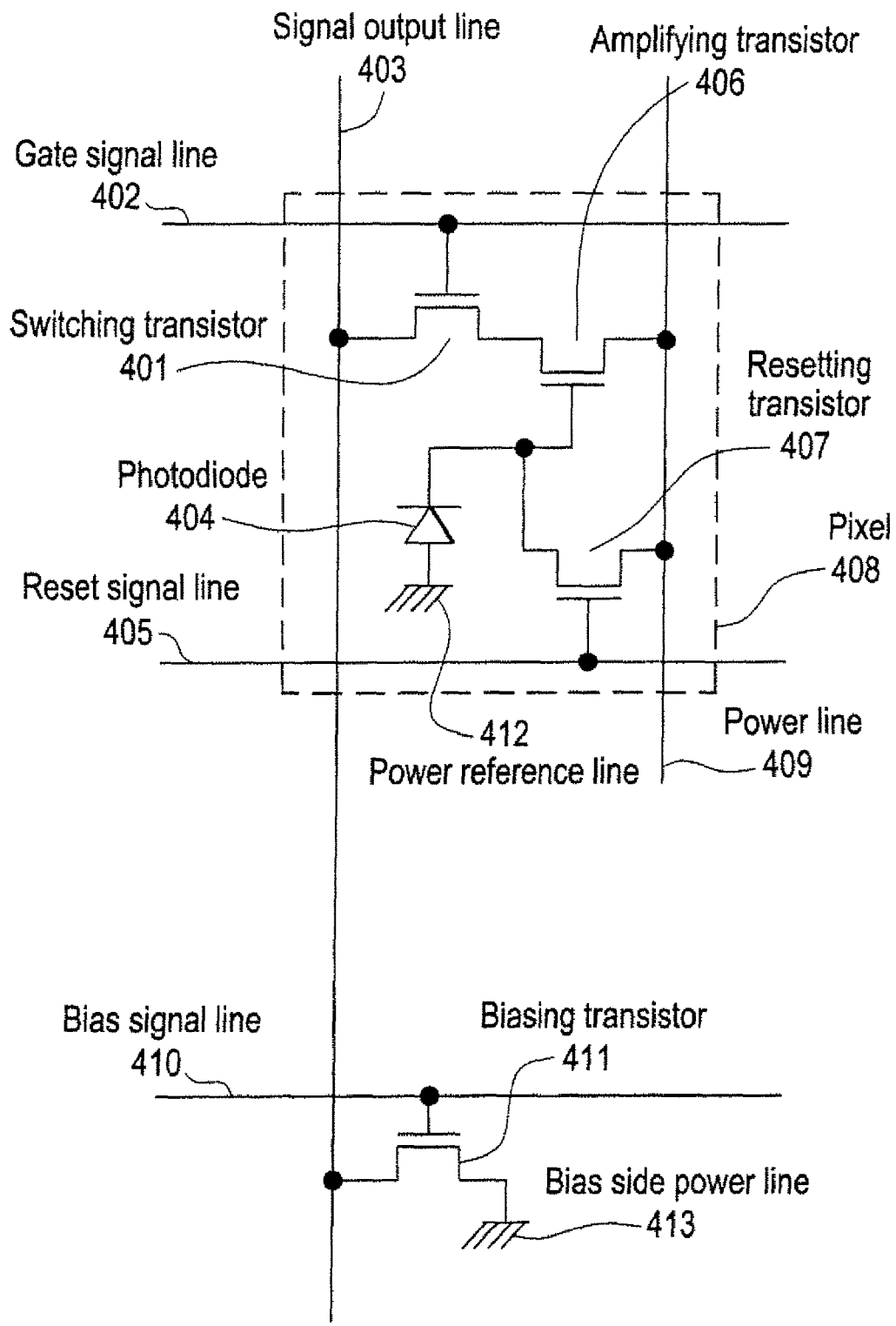
FIG. 4 is a circuit diagram of the active sensor of the prior art.
Figure 5:
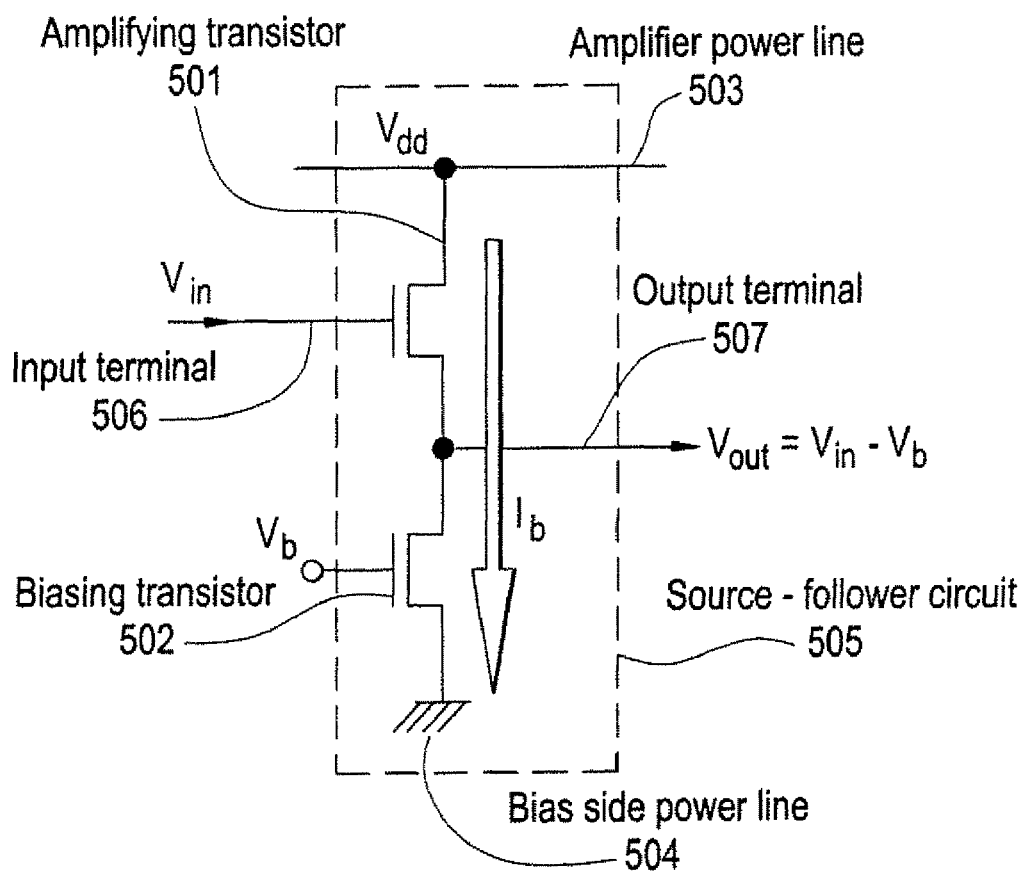
FIG. 5 is a circuit diagram of the source follower circuit.
Figure 6:
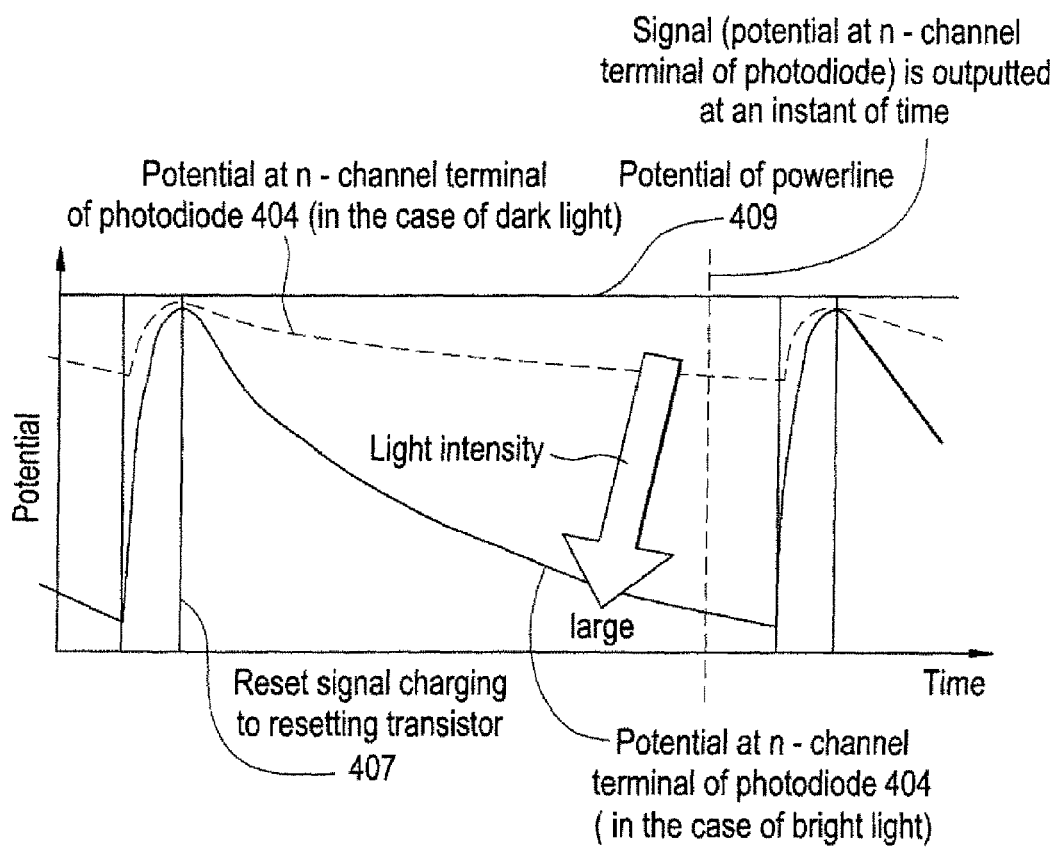
FIG. 6 is a timing chart in the active sensor.
Figure 7:
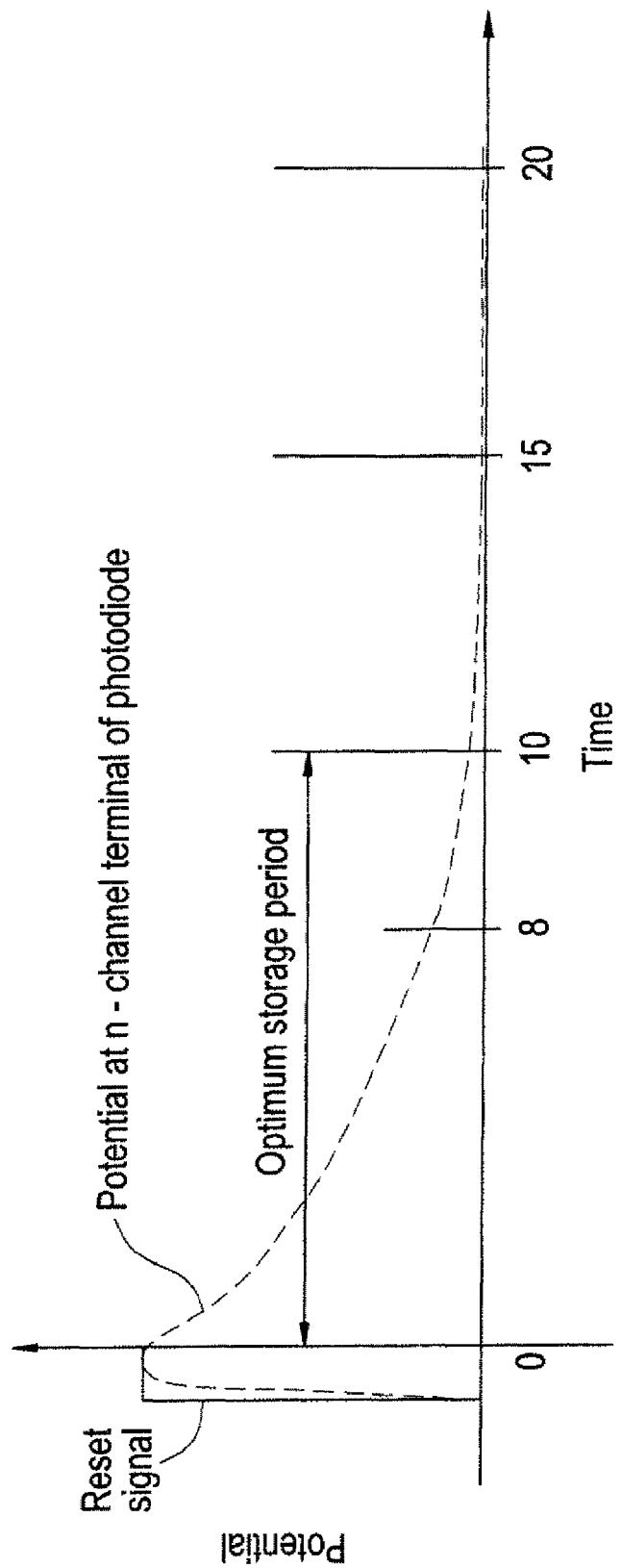
FIG. 7 is a timing chart in the active sensor.
Figure 8:
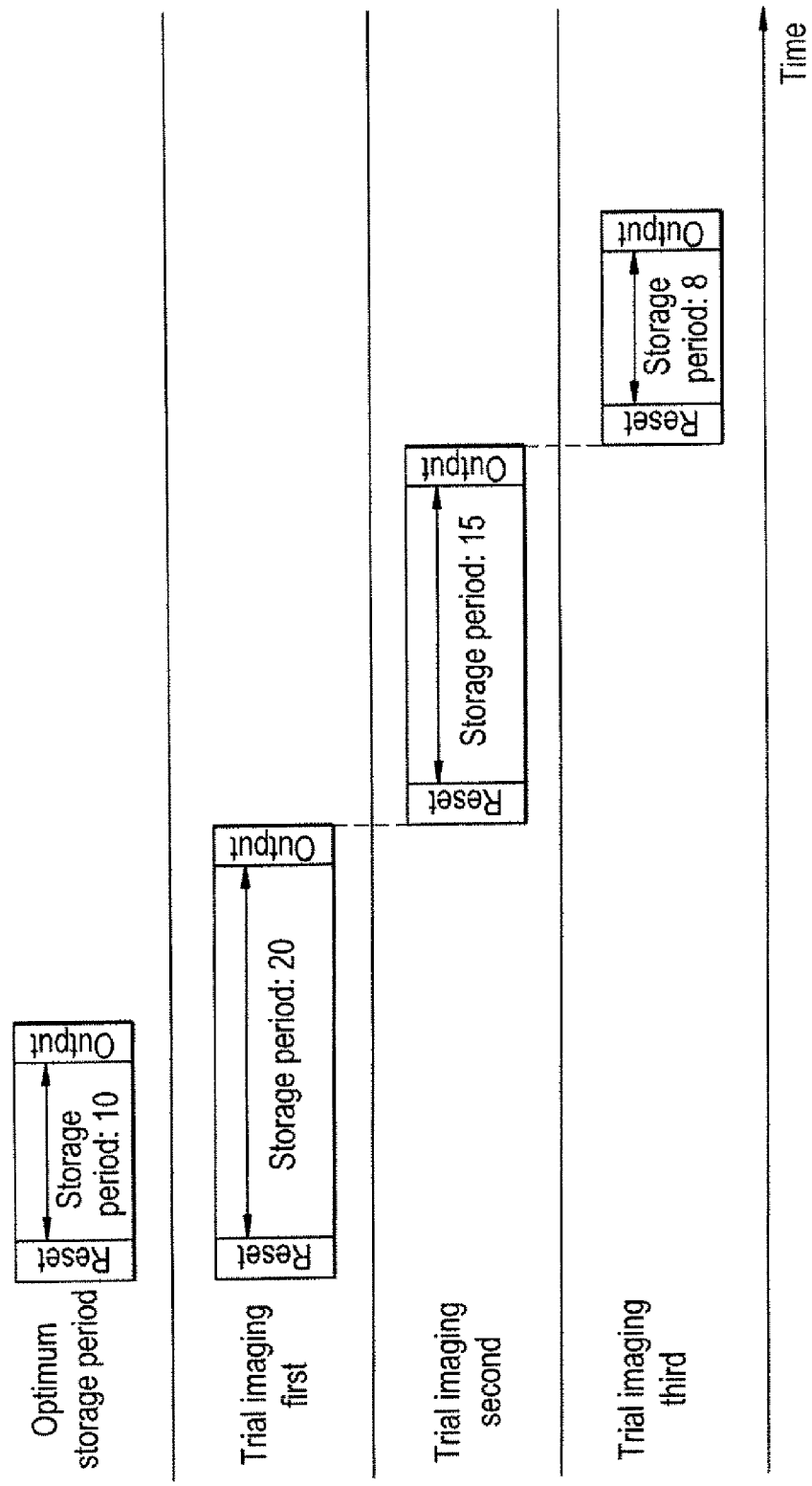
FIG. 8 is a diagram illustrating a trial imaging.
Figure 9:
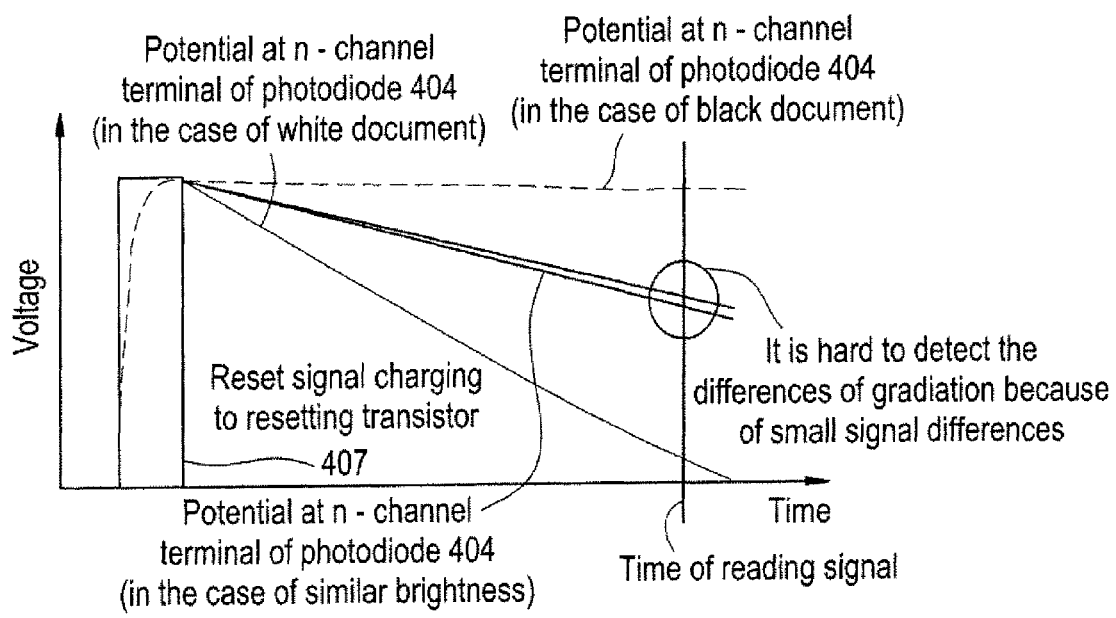
FIG. 9 is a timing chart in the active sensor.

Let it be assumed that pixels, as shown in FIG. 1, are arranged over a plurality of rows. FIG. 2 illustrates a signal timing charts in the trial imaging of this case. At first, the voltages of the reset signal lines 105 of all pixels are controlled to reset the photodiodes 104 of all pixels simultaneously. After this, the gate signal lines 102 are controlled row by row (or pixel by pixel) to output signals. These outputs are started from the first row and are then scanned.

The scans are returned again from the last row to the first and are continued to the second row, the third row and so on.

Here, it is not absolutely necessary to output the signals from the first row. Nor is it absolutely necessary to output the signals from all rows.

Here, the storage period is a period from the resetting time to the time when the signals are read out. Therefore, the storage period is different for a row if the pixels of all rows are reset all at once and if the signals are then outputted row by row. In other words, the storage period increases each time the rows change. The output signal changes with a product of the intensity of the light of an object and the storage period. Therefore, the output signal value grows gradually larger. The transition of the output signal at this time is illustrated in FIG. 10.

At this trial imaging time, however, it is assumed that the whole face is irradiated with a homogeneously light. Therefore, an equal output signal value is obtained for the pixels of a row.

The output signal value in the first row is still low. As the row increases to a k-th row, moreover, the output signal value is not saturated yet. When the row comes to an m-th row, moreover, the output signal value comes just before the saturation. As the row number further increases, moreover, the output signal does not change any more but is saturated.

Figure 10:
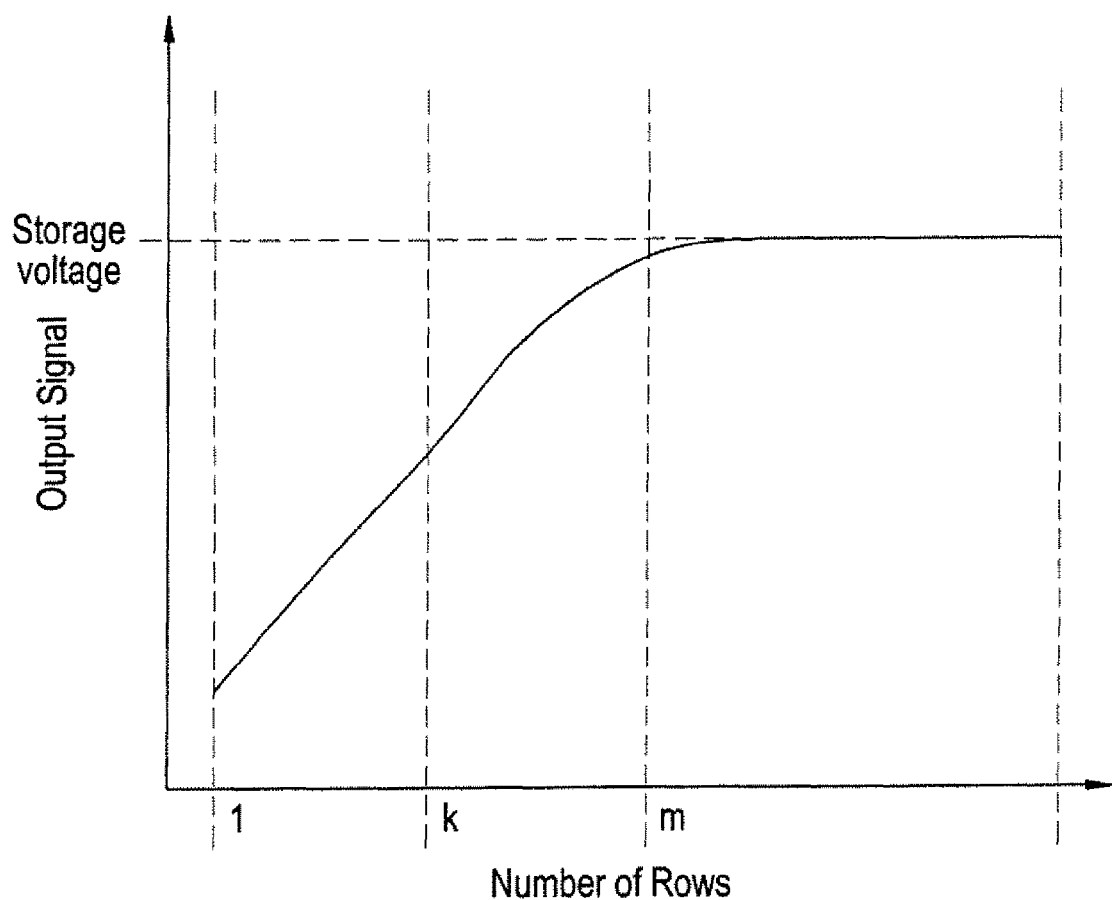
FIG. 10 is a diagram illustrating a change of an output signal in a trial imaging.

It is found out from FIG. 10 that the storage period of the signal in the m-th row is the optimum. By this trial imaging action, it is possible to determine the optimum storage period easily and quickly.

After this, there may be done the ordinary imaging action. However, the storage period to be used at this time is the value which has been determined by the trial imaging.

Here, this embodiment could be applied to the MOS passive sensor. However, this embodiment could not be applied to the CCD sensor because of its batch reset/read.

Here, the light may not have the homogeneous irradiation at the trial imaging time.

Here in the MOS sensor, the signal may be outputted at the trial imaging time exclusively from a portion of the screen because of its random reset/read.

Where the storage period is changed row by row, the signals need not be outputted from all pixels of each row. It is sufficient to output the signals from one pixel for one row.

Embodiment 1

Figure 11:
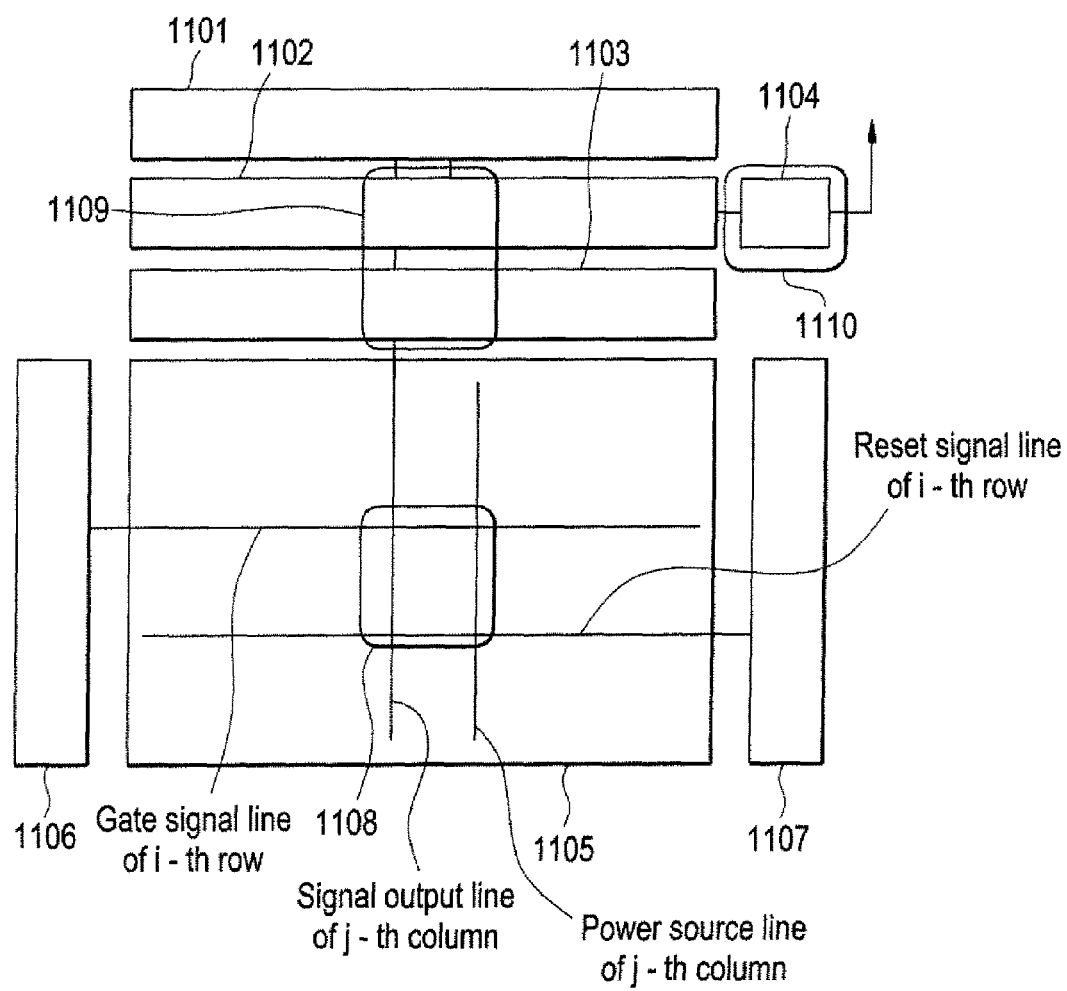
FIG. 11 is a block diagram of an area sensor of the invention.

Next, a description will be given of an example of an area sensor mounted with a drive circuit at a periphery thereof and arranged with pixels two-dimensionally. FIG. 11 shows a circuit diagram of a total thereof. First, there is provided an image pickup unit 1105 arranged with pixels two-dimensionally. Further, there are arranged drive circuits for driving a gate signal line and a reset signal line of respective pixels on the left and on the right of the image pickup portion 1105. In FIG. 11, a drive circuit 1106 for a gate signal line is arranged on the left side and a drive circuit 1107 for a reset signal line is arranged on the right side.

Further, on an upper side of the image pickup portion 1105, there are arranged circuits for signal processing. In FIG. 11, a biasing circuit 1103 is arranged on the upper side of the image pickup portion 1105. The biasing circuit 1103 constitutes a source follower circuit by being paired with an amplifying transistor of respective pixels. On the upper side of the biasing circuit 1103, there is arranged a circuit 1102 for sampling and holding and signal processing. In the circuit, there are arranged circuits for temporarily holding a signal, executing analog-digital conversion and reducing noise. On the upper side of the sampling and holding and signal processing circuit 1102, there is arranged a drive circuit 1101 for a signal output line. The drive circuit 1101 for a signal output line outputs a signal for successively outputting the temporarily held signals. Further, there is arranged a circuit 1104 for amplifying a final output before outputting a signal to outside. In the circuit, a signal which is successively outputted by the sampling and holding and signal processing circuit 1102 and the drive circuit 1101 for a signal output line, is amplified before being outputted to outside. Therefore, the circuit is not needed when the signal is not amplified, however, the circuit is frequently arranged in reality.

Figure 12:
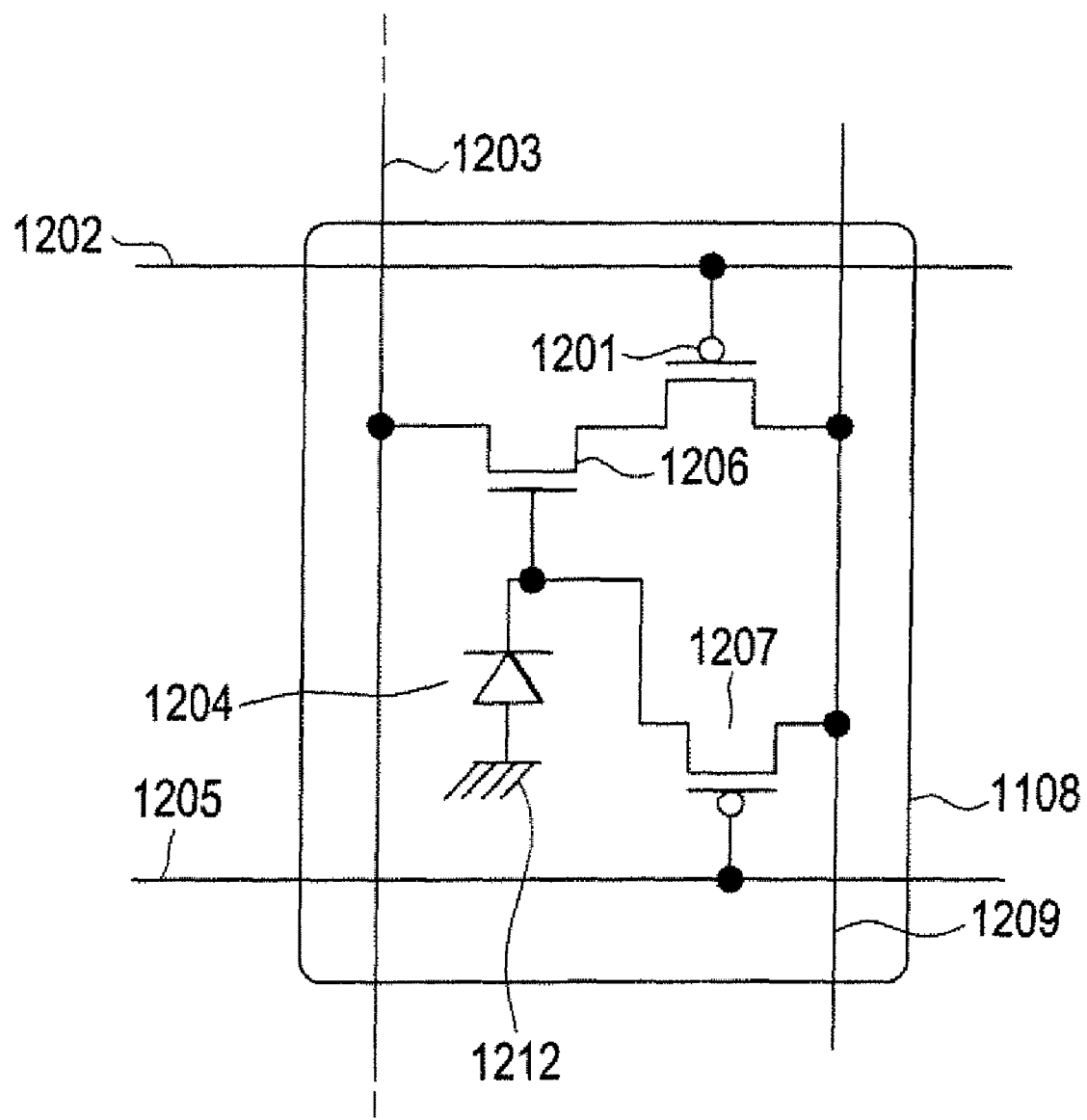
FIG. 12 is a circuit diagram of a pixel of an active sensor of the invention.

Next, circuit diagrams of respective portions will be shown. First, FIG. 12 shows a circuit diagram of a circuit 1108 of an i-th row and j-th column pixel portion as an example in the image pickup portion 1105 which is arranged with pixels two-dimensionally. In FIG. 12, the circuit 1108 is constituted by a P-channel type resetting transistor 1207, a P-channel type switching transistor 1201, an N-channel type amplifying transistor 1206 and a photoelectric conversion element (here, a photodiode 1204 which is most representative). In the photodiode 1204, a P-channel side terminal thereof is connected to a power source reference line 1212 and an N-channel side terminal thereof is connected to a gate terminal of the amplifying transistor 1206. A gate terminal of the resetting transistor 1207 is connected with an i-th row reset signal line 1205 and a source terminal and a drain terminal thereof are connected to a j-th column power source line 1209 and the gate terminal of the amplifying transistor 1206. A gate terminal of the switching transistor 1201 is connected to an i-th row gate signal line 1202 and a source terminal and a drain terminal thereof are connected to the j-th column power source line 1209 and the amplifying transistor 1206. A source terminal and a drain terminal of the amplifying transistor 1206 are connected to a j-th column signal output line 1203 and the switching transistor 1201.

In FIG. 12, a p-channel type is used in the resetting transistor 1207. However, the resetting transistor may be of an N-channel type. However, in the case of the N-channel type, in resetting operation, voltage between the gate and the source cannot be made large. Therefore, the resetting transistor is operated in a saturated region and the photodiode 1204 cannot be charged sufficiently. Therefore, although the resetting transistor can be operated with the N-channel type, the P-channel type is more preferable.

It is preferable that the switching transistor 1201 is arranged between the j-th column power source line 1209 and the amplifying transistor 1206 and the P-channel type is used therefor. However, an N-channel type may be used therefor since the switching transistor 1201 is operated even with the N-channel type similar to the conventional case and may be arranged between the j-th column signal output line 1203 and the amplifying transistor 1206. However, the N-channel type one is difficult to correctly output a signal and accordingly, it is preferable that the switching transistor 1201 is arranged between the j-th column power source line 1209 and the amplifying transistor 1206 and the P-channel type is used therefor.

In FIG. 12, the N-channel type is used for the amplifying transistor 1206. However, a P-channel type can be used therefor. However, in that case, when the amplifying transistor 1206 is operated as a source follower circuit by being combined with a biasing transistor, it is necessary to change a method of connecting the circuit. That is, the amplifying transistor 1206 is not operated by simply changing the polarity of the amplifying transistor 1206 in the circuit diagram of FIG. 12.

Figure 13:
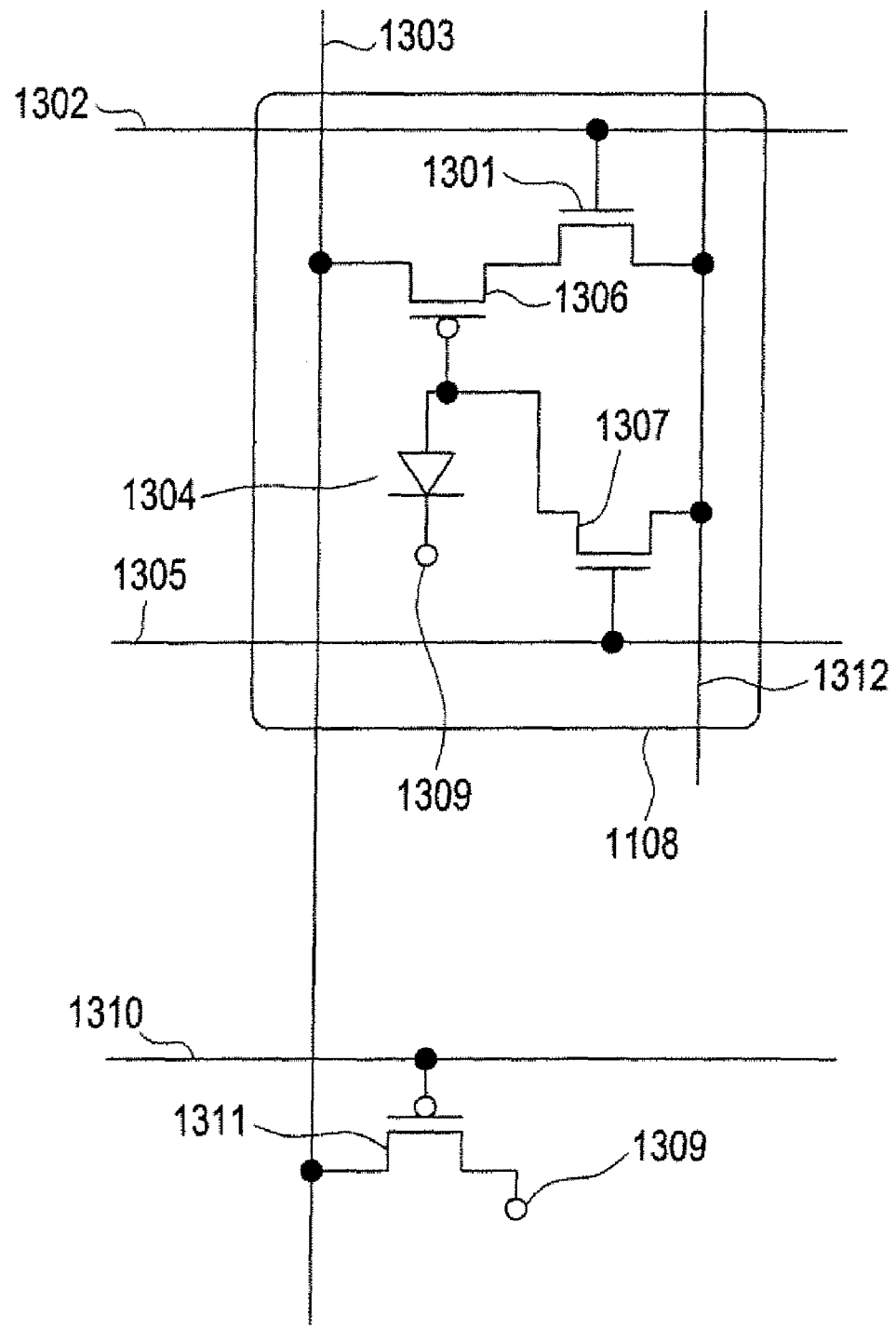
FIG. 13 is a circuit diagram of a pixel of an active sensor of the invention.

Hence, FIG. 13 shows an example of a circuit constitution when the amplifying transistor of the P-channel type is used. A difference of constitution from that of FIG. 12 resides in that the polarity of an amplifying transistor 1306 is of the P-channel type, a direction of a photodiode is reversed and a power source line and a power source reference line are switched. When the P-channel type is used for the amplifying transistor, it is necessary to use the P-channel type in a biasing transistor. Because the biasing transistor needs to operate as a constant current source. Therefore, in FIG. 13, for reference, a biasing transistor 1311 is also illustrated. The i-th row and j-th column pixel portion circuit 1108 shown in FIG. 13 is constituted by an N-channel type resetting transistor 1307, an N-channel type switching transistor 1301, a P-channel type amplifying transistor 1306 and a photoelectric conversion element (here, a photodiode 1304 which is most representative). An N-channel side terminal of the photodiode 1304 is connected to a power source line 1309 and a P-channel side terminal thereof is connected to a gate terminal of the amplifying transistor 1306. A gate terminal of the resetting transistor 1307 is connected with an i-th row reset signal line 1305 and a source terminal and a drain terminal thereof are connected to a j-th column power source reference line 1312 and the gate terminal of the amplifying transistor 1306. A gate terminal of the switching transistor 1301 is connected to an i-th row gate signal line 1302 and a source terminal and a drain terminal thereof are connected to the j-th column power source reference line 1312 and the amplifying transistor 1306. A source terminal and a drain terminal of the amplifying transistor 1306 are connected to a j-th row signal output line 1303 and the switching transistor 1301. A gate terminal of the biasing transistor 1311 is connected with a bias signal line 1301 and a source terminal and a drain terminal thereof are connected to the j-th column signal output line 1303 and the power source line 1309.

In FIG. 13, the N-channel type is used for the resetting transistor 1307. However, the resetting transistor may be of a P-channel type. However, in the case of the P-channel type, in resetting operation, voltage between the gate and the source cannot be made large. Therefore, the resetting transistor is operated in a saturated region and the photodiode 1304 cannot be charged sufficiently. Therefore, although the resetting transistor is operated by the P-channel type, the N-channel type is preferable.

In FIG. 13, it is preferable that the switching transistor 1301 is arranged between the j-th column power source reference line 1312 and the amplifying transistor 1306 and the N-channel type is used therefor. However, since the switching transistor 1301 is operated also by a P-channel type, the P-channel type may be used or may be arranged between the j-th column signal output line 1303 and the amplifying transistor 1306. However, it is difficult to correctly output a signal and therefore, it is preferable that switching transistor 1301 is arranged between the j-th column power source reference line 1309 and the amplifying transistor 1306 and the N-channel type is used therefor.

In this way, as is apparent by comparing FIG. 12 and FIG. 13, when the polarity of the amplifying transistor is changed, an optimum constitution of the transistor and the direction of the photodiode are also changed.

In FIG. 12, current is supplied from a single piece of the power source line to both of the switching transistor 1201 and the resetting transistor 1207. In FIG. 13, current is supplied from a single piece of the power source reference line to both of the switching transistor 1301 and the resetting transistor 1307. In this way, by matching the direction of the photodiode and the polarity of the amplifying transistor, wirings can be shared.

Figure 14:
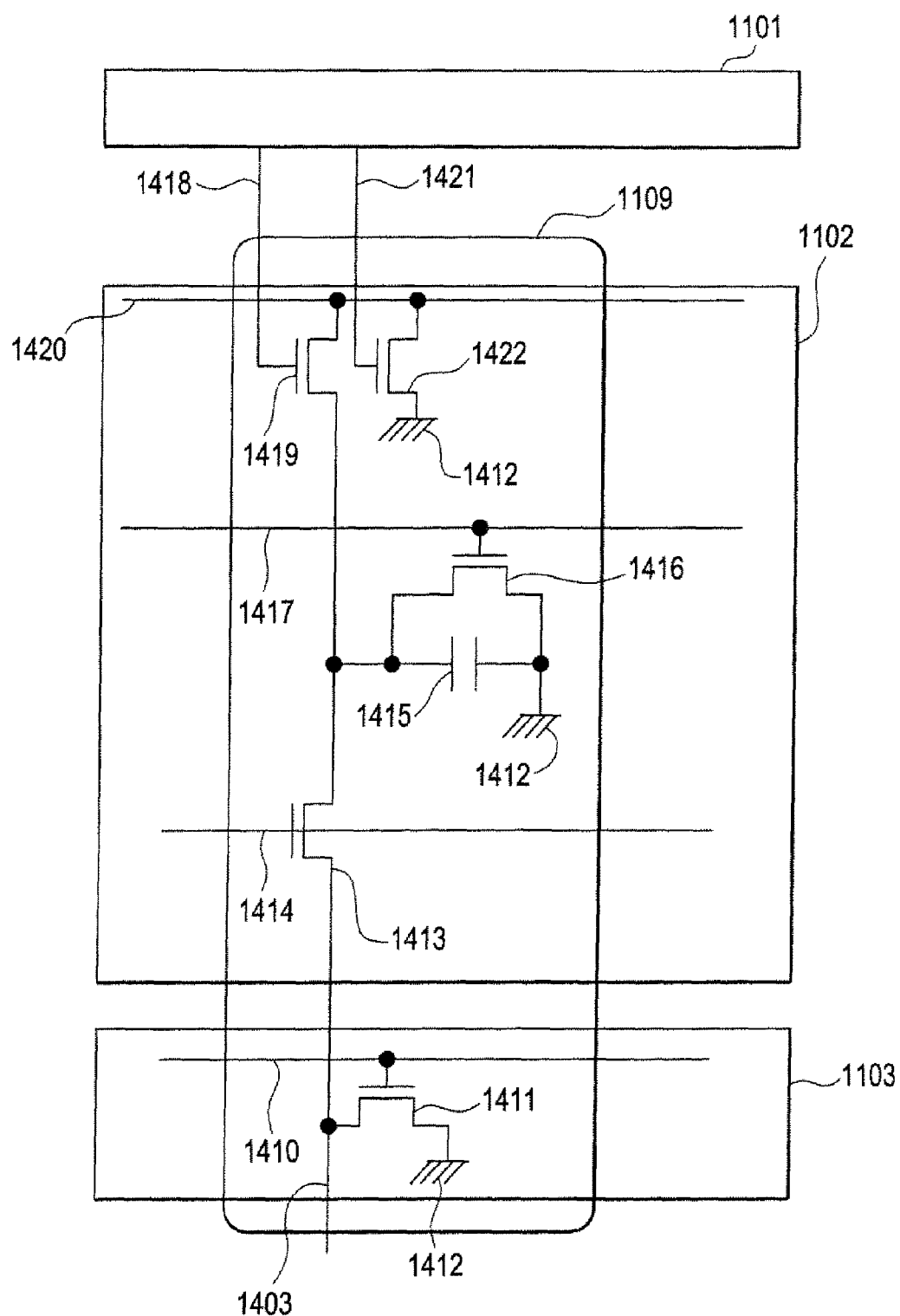
FIG. 14 is a circuit diagram of a signal processing circuit of the invention.

Next, FIG. 14 shows a circuit diagram of a j-th column peripheral portion circuit 1109 as a circuit for one column from the biasing circuit 1103 and the sampling and holding signal processing circuit 1102. The biasing circuit 1103 is arranged with a biasing transistor 1411. The polarity is the same as the polarity of the amplifying transistor of respective pixels. Therefore, when the amplifying transistor of pixel is of an N-channel type, the biasing transistor is also of the N-channel type. In FIG. 14, the biasing transistor 1411 is of the N-channel type. A gate terminal of the biasing transistor 1411 is connected with a bias signal line 1410 and a source terminal and a drain terminal thereof are connected to a j-th column signal output line 1403 and a power source reference line 1412 (when the biasing transistor is of a P-channel type, a power source line is used in place of the power source reference line). The biasing transistor 1411 is operated as a source follower circuit by being paired with the amplifying transistor of respective pixels. A gate terminal of a transferring transistor 1413 is connected with a transfer signal line 1414 and a source terminal and a drain terminal thereof are connected to a j-th column signal output line 1403 and a storage capacitor 1415. The transferring transistor is operated when potential of the signal output line 1403 is transferred to the storage capacitor 1415. Therefore, a transferring transistor of a P-channel type may be added and connected in parallel with the N-channel type transferring transistor 1413. The storage capacitor 1415 is connected to the transferring transistor 1413 and the power source reference line 1412. The role of the storage capacitor 1415 resides in temporarily storing a signal outputted from the signal output line 1403. A gate terminal of a discharging transistor 1416 is connected to a predischarge signal line 1417 and a source terminal and a drain terminal thereof are connected to the storage capacitor 1415 and the power source reference line 1412. The discharging transistor 1416 is operating to temporarily discharge electric charge stored in the storage capacitor 1415 before inputting the potential of the signal output line 1403 to the storage capacitor 1415.

Further, an analog-digital signal conversion circuit or a noise reducing circuit can also be arranged.

Further, a finally selecting transistor 1419 is connected between the storage capacitor 1415 and a final output line 1420. A source terminal and a drain terminal of the finally selecting transistor 1419 are connected to the storage capacitor 1415 and the final output line 1420, and a gate terminal thereof is connected to a j-th column final selection line 1418. The final selection line is scanned successively from a first column. Further, when the j-th column final selection line 1418 is selected and the finally selecting transistor 1419 is brought into a conductive state, potential of the storage capacitor 1415 and potential of the final output line 1420 become equal to each other. As a result, a signal stored in the storage capacitor 1415 can be outputted to the final output line 1420. However, when electric charge is stored in the final output line 1420 before outputting the signal to the final output line 1420, the potential in outputting the signal to the final output line 1420 is influenced by the electric charge. Therefore, before outputting the signal to the final output line 1420, the potential of the final output line 1420 must be initialized to a certain potential value. In FIG. 14, a final resetting transistor 1422 is arranged between the final output line 1420 and a power source reference line 1412. Further, a gate terminal of the finally resetting transistor 1422 is connected with a j-th column final reset line 1421. Further, before selecting the j-th column final selection line 1418, the j-th column final reset line 1421 is selected and the potential of the final output line 1420 is initialized to potential of the power source reference line 1412. Thereafter, the j-th column final selection line 1418 is selected and the signal stored to the storage capacitor 1415 is outputted to the final output line 1420.

Figure 15:
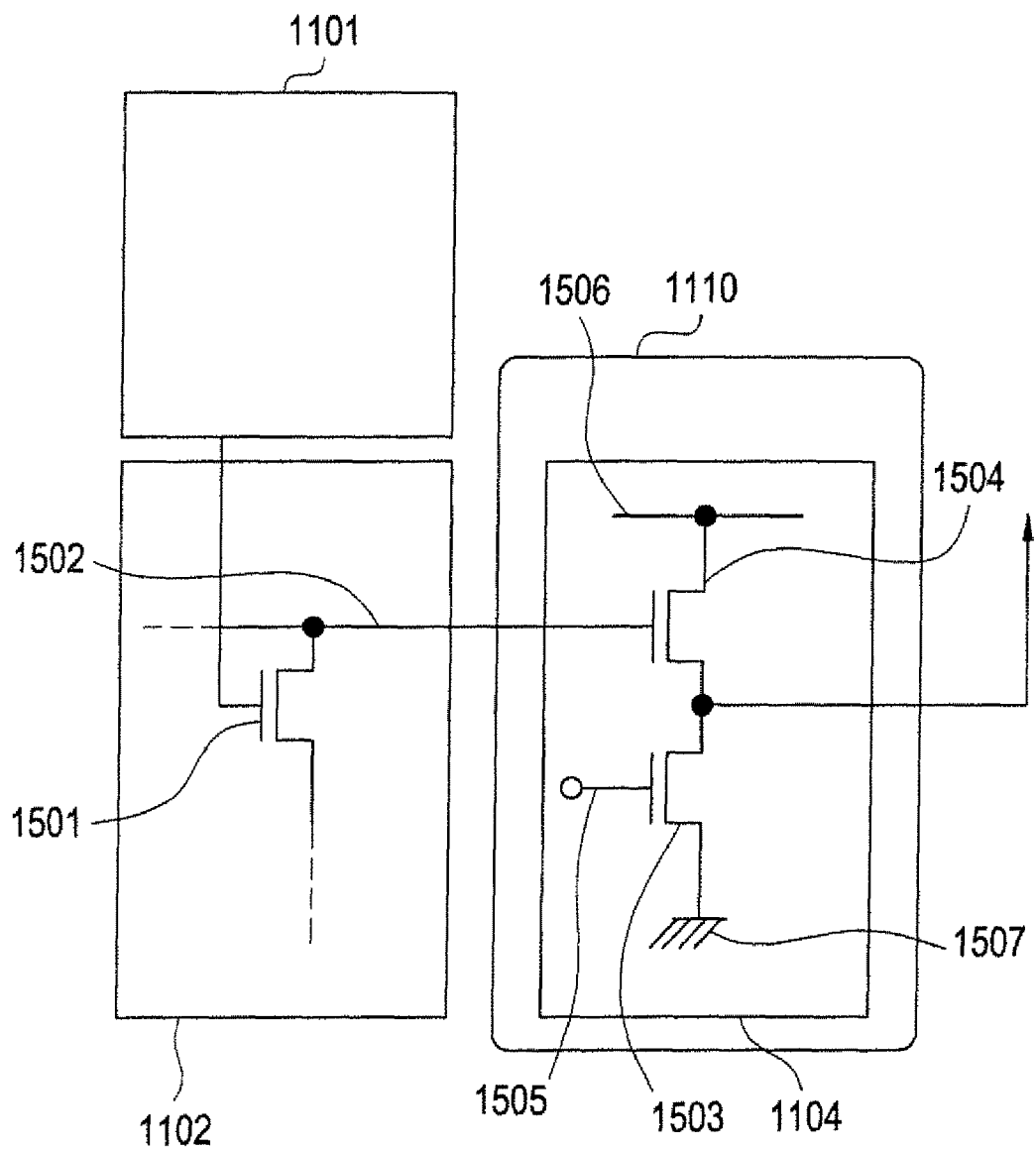
FIG. 15 is a circuit diagram of a final output amplifying circuit of the invention.

The signal outputted to the final output line 1420 may be outputted to outside as it is. However, the signal is frequently amplified before being outputted to outside since the signal is very weak. FIG. 15 shows a circuit of a final portion circuit 1110 as a circuit therefor. There are various circuits for amplifying a signal such as an operational amplifier. Although any circuit may be used so far as the circuit is a circuit for amplifying a signal, in this case, as the simplest circuit constitution, a source follower circuit is shown. FIG. 15 shows a case of an N-channel type. An input to the final output amplifying circuit 1104 is a final output line 1502. The final output line 1502 is outputted with a signal successively from a first column. The signal is amplified by the final output amplifying circuit 1104 and is outputted to outside. The final output line 1502 is connected to a gate terminal of an amplifying transistor 1504 for amplifying final output. A drain terminal of the amplifying transistor 1504 for amplifying final output is connected to a power source line 1506 and a source terminal thereof constitutes an output terminal. A gate terminal of a biasing transistor 1503 for amplifying final output is connected to a bias signal line 1505 for amplifying final output. A source terminal and a drain terminal thereof are connected to a power source reference line 1507 and a source terminal of the amplifying transistor 1504 for amplifying final output.

Figure 16:
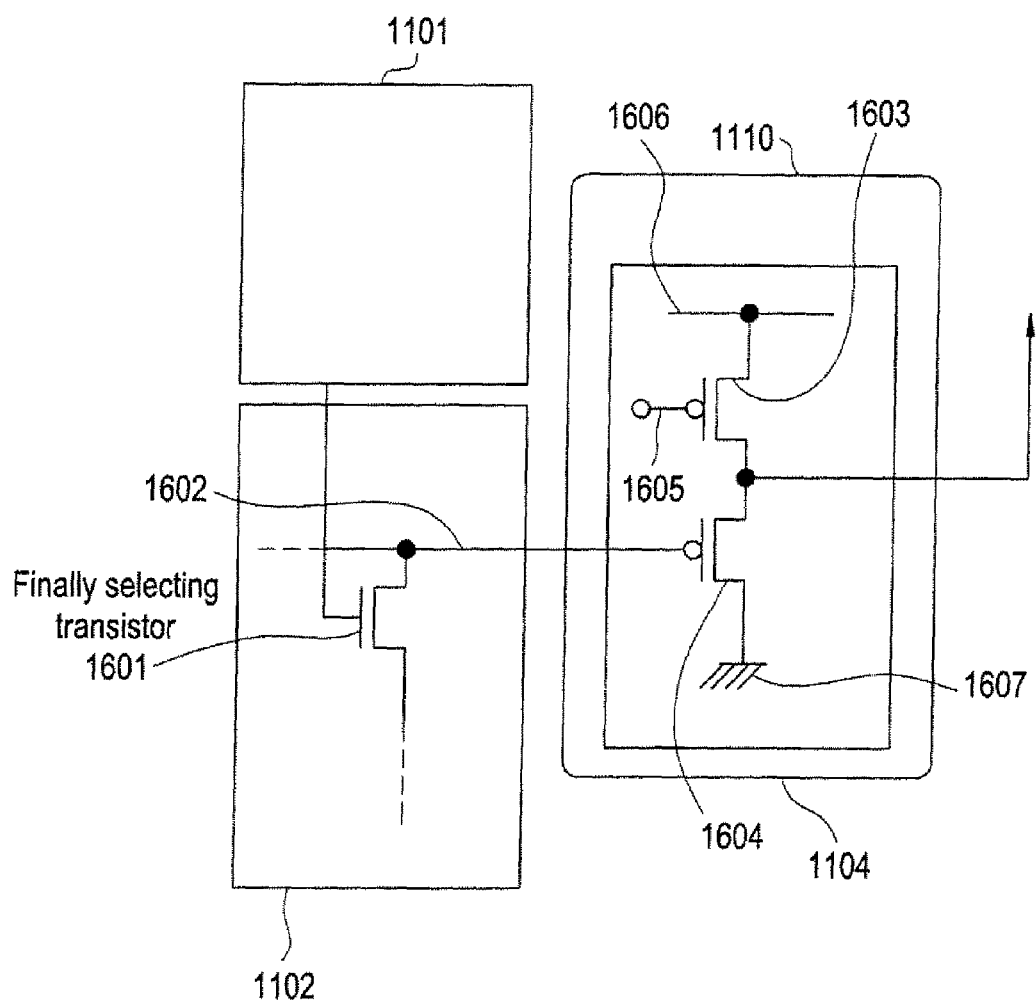
FIG. 16 is a circuit diagram of a final output amplifying circuit of the invention.

FIG. 16 shows a circuit diagram when a source follower circuit in the case of a P-channel type is used. A difference between FIG. 15 and FIG. 16 resides in that the power source line and the power source reference line are reversed. A final output line 1602 is connected to a gate terminal of an amplifying transistor 1604 for amplifying final output. A drain terminal of the amplifying transistor 1604 for amplifying final output is connected to a power source reference line 1607 and a source terminal thereof constitutes an output terminal. A gate terminal of a biasing transistor 1603 for amplifying final output is connected to a bias signal line 1605 for amplifying final output. A source terminal and a drain terminal thereof are connected to a power source line 1606 and the source terminal of the amplifying transistor 1604 for amplifying final output. Values of potential of the bias signal line 1605 for amplifying final output and potential of the bias signal line 1505 for amplifying final output in the case of using the N-channel type, differ from each other.

In FIG. 15 and FIG. 16, the source follower circuit of only one stage is constituted. However, source follower circuits of a plurality of stages may be constituted. For example, when source follower circuits of two stages are constituted, an output terminal of a first stage may be connected to an input terminal of a second stage thereof. Further, in the respective stages, either of the N-channel type and the P-channel type may be used.

The drive circuit 1106 for a gate signal line, the drive circuit 1107 for a reset signal line and the drive circuit 1101 for a signal output line are circuits simply outputting pulse signals. Therefore, the circuits can be implemented by using a publicly-known technology.

Figure 17:
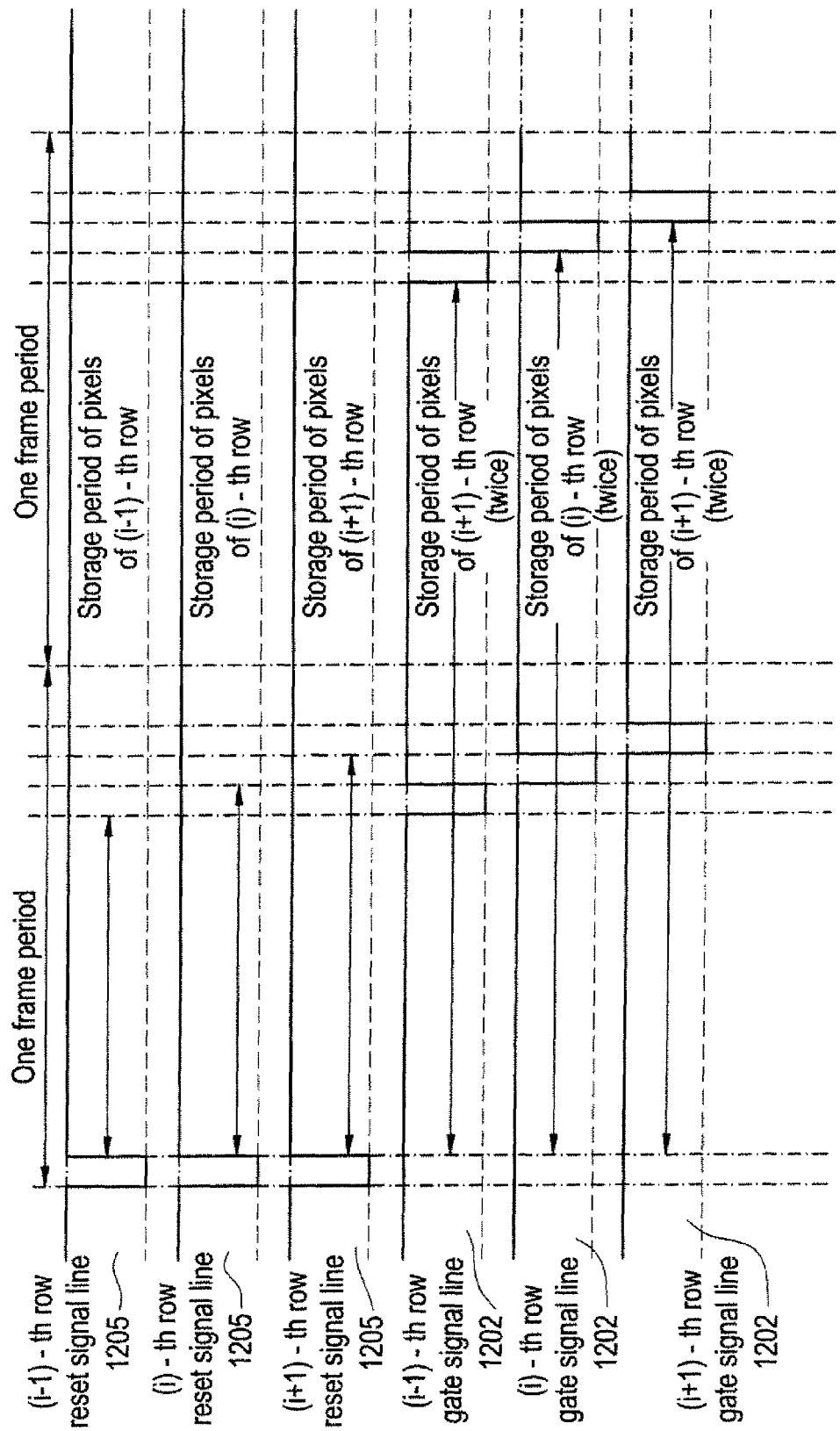
FIG. 17 is a timing chart in a trial imaging of the invention.

Next, a description will be given of a timing chart of signals when trial imaging is done. First, FIG. 17 shows a timing chart of the circuits of FIG. 11 and FIG. 12. First, the reset signal lines of all rows are controlled to reset pixels at the same time. Thereafter, the gate signal lines are successively scanned from the first row. For example, an (i−1)-th row is selected, successively, an i-th row is selected and successively, an (i+1)-th row is selected. Then, after the scan is performed to the last row, the gate signal lines are similarly scanned successively from the first row and the similar operation is repeated.

A time period from when the pixel is reset until the gate signal line is selected and signal is outputted constitutes a storage period. During the storage period, the photodiode stores electric charge generated by light. In the respective rows, a timing of resetting is same and a timing of outputting the signal is different.

Figure 18:
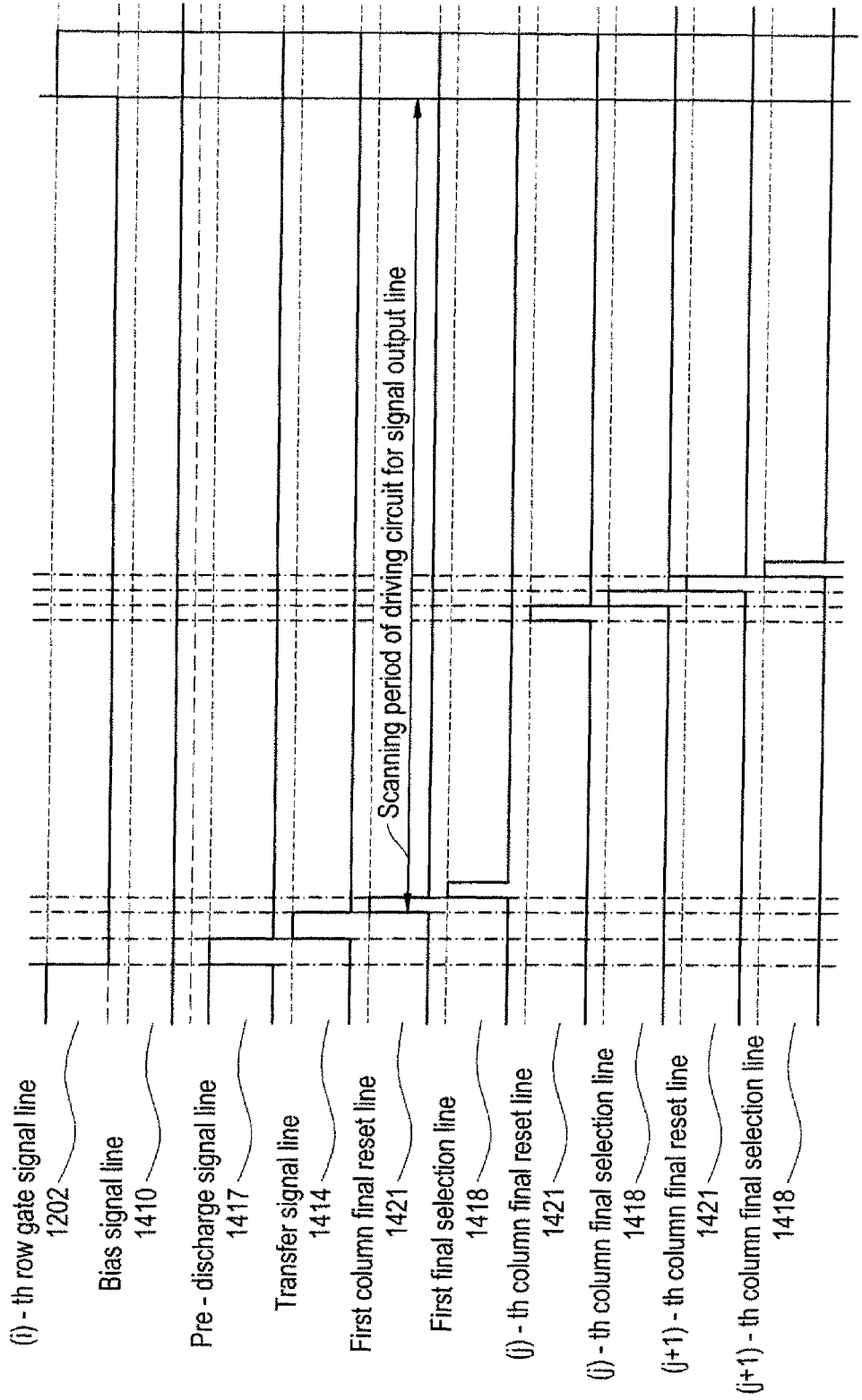
FIG. 18 is a timing chart in the invention.

Next, FIG. 18 shows a timing chart of signals in FIG. 14. Since the operation is repeated, as an example, a consideration will be given of the case of selecting the gate signal line of the i-th row. First, after selecting the gate signal line 1202 of the i-th row, the predischarge signal line 1417 is selected and the discharging transistor 1416 is brought into a conductive state. Thereafter, the transfer signal line 1414 is selected. Then, a signal of respective rows is outputted from the pixel of the i-th row to the storage capacitor 1415 of the respective rows.

After storing signals of all of the pixels at the i-th row in the storage capacitors 1415 of the respective columns, signals of the respective columns are successively outputted to the final output line 1420. During a time period after the transfer signal line 1414 is not selected until the gate signal line is selected, all the columns are scanned by the drive circuit 1101 for a signal output line. First, the final reset line of the first column is selected, the final resetting transistor 1422 is brought into a conductive state and the final output line 1420 is initialized to the potential of the power source reference line 1412. Thereafter, the final selection line 1418 of the first column is selected, the finally selecting transistor 1419 is brought into a conductive state and a signal of the storage capacitors 1415 of the first column is outputted to the final output line 1420. Next, the final reset line of a second column is selected, the final resetting transistor 1422 is brought into a conductive state and the final output line 1420 is initialized to the potential of the power source reference line 1412. Thereafter, the final selection line 1418 of the second column is selected, the finally selecting transistor 1419 is brought into a conductive state and a signal of the storage capacitor 1415 at the second column is outputted to the final output line 1420. Thereafter, similar operation is repeated. In the case of a j-th column, the final reset line of the j-th column is selected, the finally resetting transistor 1422 is brought into a conductive state and the final output line 1420 is initialized to the potential of the power source reference line 1412. Thereafter, the final selection line 1418 of the j-th column is selected, the finally selecting transistor 1419 is brought into a conductive state and a signal of the storage capacitor 1415 of the j-th column is outputted to the final output line 1420. Successively, the final reset line of a (j+1)-th column is selected, the finally resetting transistor 1422 is brought into a conductive state and the final output line 1420 is initialized to the potential of the power source reference line 1412. Thereafter, the final selection line 1418 of the (j+1)-th column is selected, the final selecting transistor 1419 is brought into a conductive state and a signal of the storage capacitor 1415 of the (j+1)-th column is outputted to the final output line 1420. Thereafter, similar operation is repeated and signals of all the columns are successively outputted to the final output line. During the time period, the potential of the bias signal line 1410 stays to be constant. The signal outputted to the final output line 1420 is amplified by the circuit 1104 for amplifying final output and is outputted to outside.

Next, the gate signal line of a (i+1)-th row is selected. Then, the operation is carried out similar to that in selecting the gate signal line of the i-th row. Further, the gate signal line of a successive row is selected and similar operation is repeated.

Figure 19:
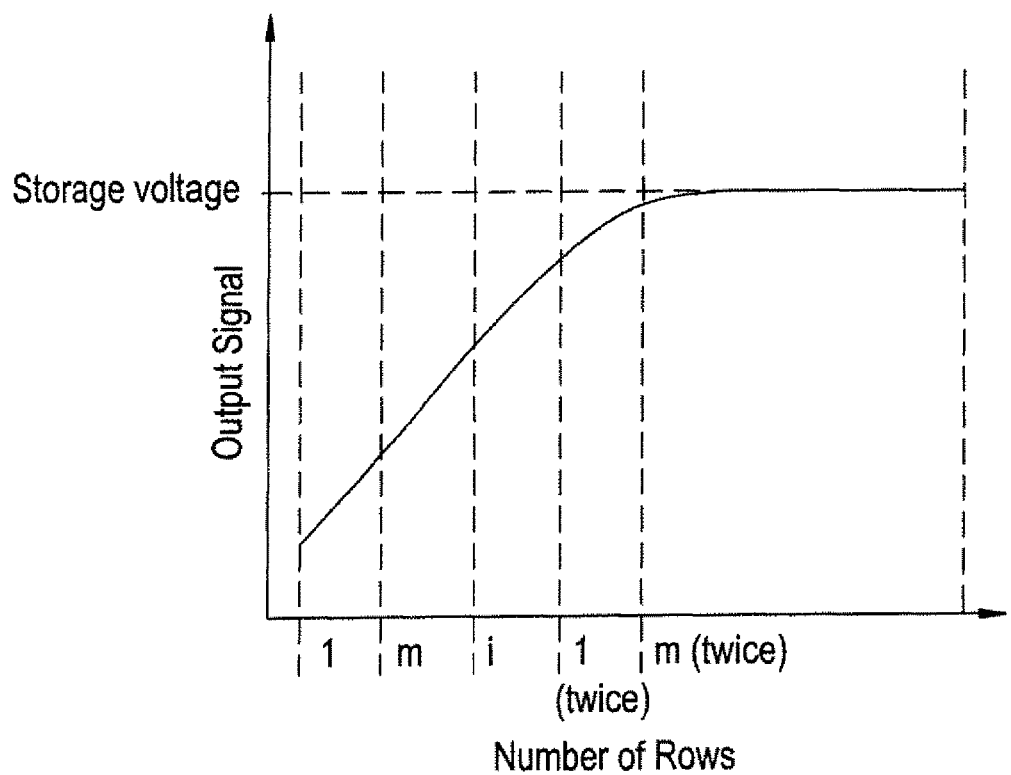
FIG. 19 is a diagram illustrating a change of an output signal in the trial imaging of the invention.

FIG. 19 is a diagram illustrating an output signal (an output from the circuit 1104 for amplifying final output) which changes for each row on the case in which the whole face is irradiated with the homogeneous light. However, the same output signal value is outputted from the pixel in the same row and therefore, only one output signal for each row is illustrated.

First, the value of the signal outputted from a first row is small because a storage period is short. Then, as the row number increases, an output signal value grows larger. In a case where the signal is not saturated after signals are outputted from all rows, the signal is outputted again from the first row. Then, if the signal begins to be saturated just after the pixel of the m-th row at second read-out, the storage period of the pixel of the m-th row at second read-out can be optimum storage period.

The above mentioned trial imaging is done, thereby the optimum storage period can be easily and quickly known.

Thereafter, the optimum storage period is set to perform ordinary imaging. In the operation, the difference between an ordinary imaging and a trial imaging is only the timing of resetting. Next, a description will be given of a timing chart of signals at an ordinary imaging.

Figure 20:
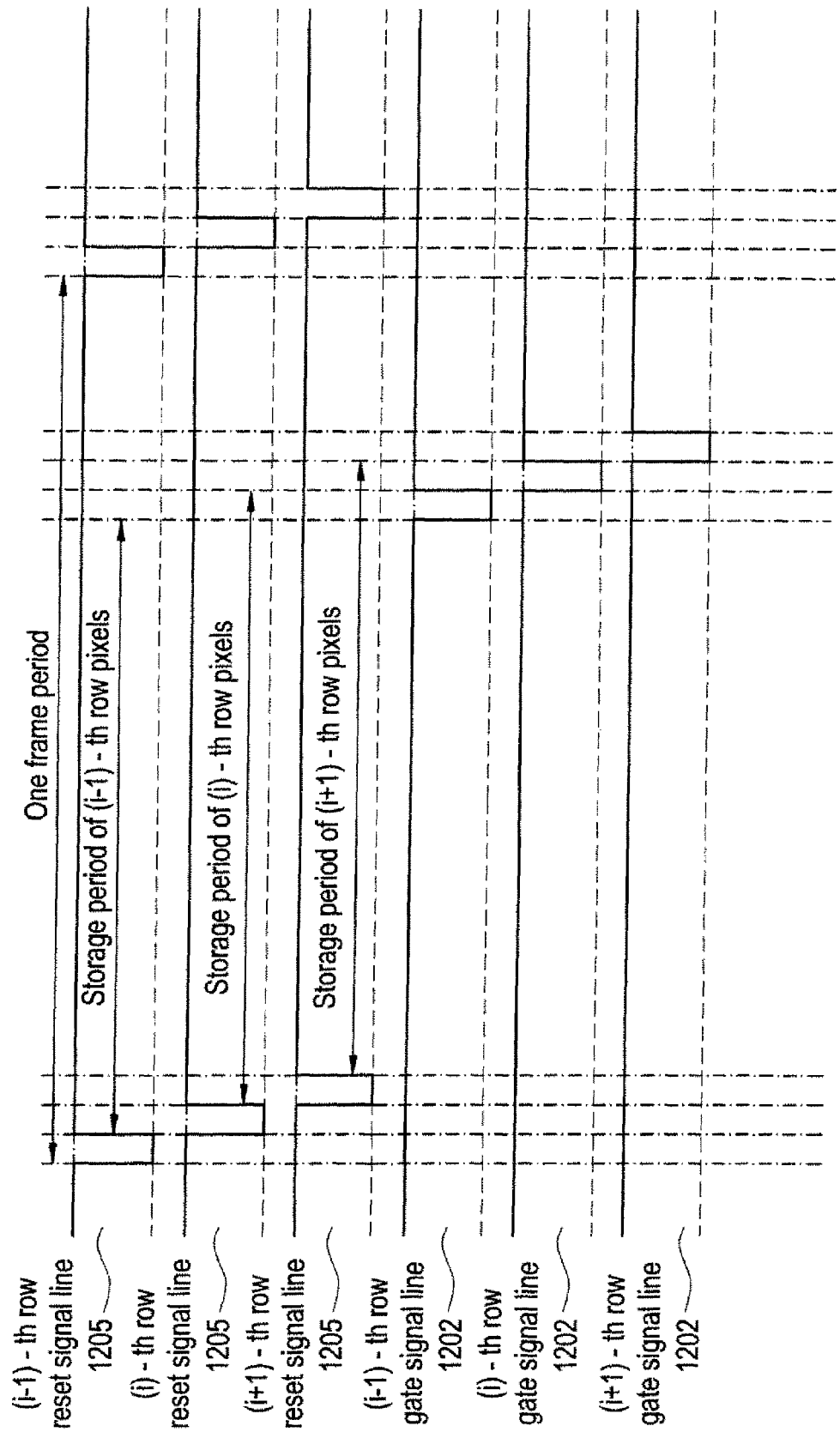
FIG. 20 is a timing chart in the invention.

First, FIG. 20 shows timing charts of the circuits of FIG. 11 and FIG. 12. The reset signal lines are successively scanned from the first row. For example, an (i−1)-th row is selected, successively, an i-th row is selected and successively, an (i+1)-th row is selected. A period until selecting the same row again corresponds to the frame period. The gate signal lines are similarly scanned successively from the first row. However, a timing of starting to scan the gate signal line is later than a timing of starting to scan the reset signal line. For example, when attention is paid to a pixel of the i-th row, the reset signal line of the i-th row is selected and thereafter, the gate signal line of the i-th row is selected. When the gate signal line of the i-th row is selected, a signal is outputted from the pixel of the i-th row. A time period from when the pixel is reset until the signal is outputted constitutes a storage period. During the storage period, the photodiode stores electric charge generated by light. In the respective rows, a timing of resetting and a timing of outputting the signal, differ from each other. Therefore, although the storage period is equal in the pixels of all the rows, the timing of this storage differs.

The timing chart of signals shown in FIG. 14 is the same as that shown in FIG. 18.

In this way, only by changing the timing of controlling the reset signal line, a trial imaging and an ordinary imaging can be easily changed.

The MOS active sensor is capable of performing a random reset/read a non-destructive reading, so that such an operation becomes possible. However, the operation can not be realized by using a CCD sensor.

Note that a MOS passive sensor can be applied. However, since the reading at a MOS passive sensor is destructive reading, the signal read out can not be done after second read out at a trial imaging. Therefore, it is necessary to find out an optimum storage period for one scanning. In the case, after resetting, output time of a first row signal is controlled and trial imaging may be performed. Note that the time from resetting until a signal of first row is outputted may be controlled in a case of using a MOS active sensor.

Note that the sensor unit for the photoelectric conversion is exemplified by a PIN type diode, an avalanche diode, a npn buried type diode, a Schottky diode, a photoconductor for an X-ray or a sensor for an infrared ray in addition to the ordinary PN type photodiode. Further, after the X-ray is converted into light by a fluorescent material or a scintillator, the light may be read out.

As mentioned above, the photoelectric conversion element is often connected to an input terminal of the source-follower circuit. However, as of the photo-gate type, switches may be inserted therebetween. On the other hand, as of the logarithmic conversion type, signals which were treated to be logarithmic value of the light intensity, may be inputted to input terminal.

Note that an area sensor arranged with pixels two dimensionally was described in the present embodiment, however, a line sensor arranged with pixels one-dimensionally can be realized.

As described in this embodiment, homogeneous light is irradiated at the trial imaging time, and it can be applied at the trial imaging by the scanners. Namely, irradiation with homogeneous light can be applied at the trial imaging using whole white documents for correction before imaging real documents. For example, in a case where light intensities of the power source of scanners are unknown, it is possible to determine the optimum storage period easily and quickly by applying the present embodiment. In addition, the ordinary imaging is performed for the document to be actually read, thereby it is possible to read out with accuracy.

Embodiment 2

Embodiment 1 has been described on the case in which the whole face is irradiated with the homogeneous light at the trial imaging time. Here will be described the case in which the whole face is irradiated with a non-uniform light at the trial imaging time.

However, the actions and the circuits are substantially identical to those of Embodiment 1. Since the whole face is irradiated with the non-uniform light, however, even the pixels of the same row, i.e., the pixels of the same storage period have different signal values. Where the transition of the signal values for row numbers are illustrated, as illustrated in FIG. 19, therefore, it is unknown what value should be employed as the output signal value in a certain row.

In this case, the output signal value having the highest amplitude value (corresponding to the highest optical intensity) in each row may be used and plotted in the graph shown in FIG. 19. Then, all the remaining contents are identical to those of Embodiment 1.

This embodiment of the irradiation with the heterogeneous light in the trial imaging can be applied to the case in which a wholly blackish document (of the newspaper or the like) is to be read out. This document is hard to read out exactly because it has little gradation difference between the character portion and the remaining portion.

Figure 21:
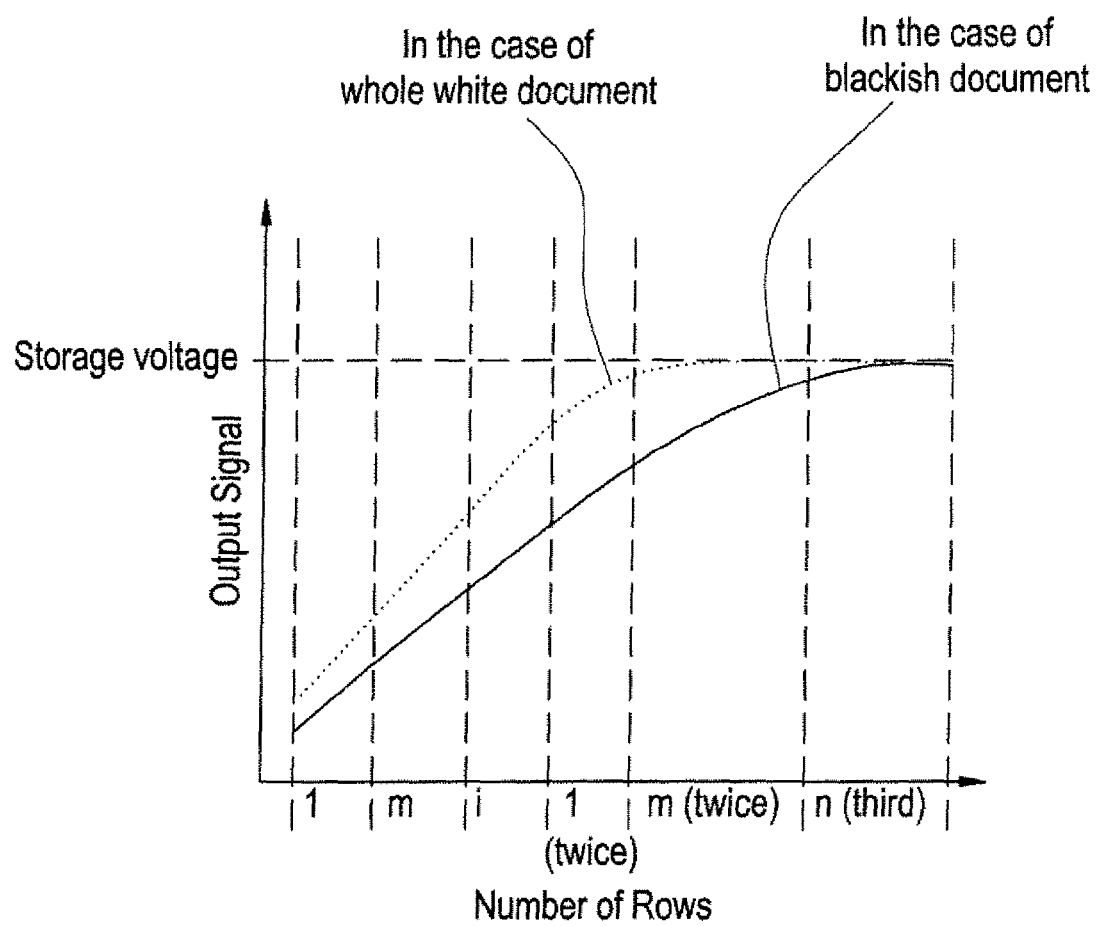
FIG. 21 is a diagram illustrating a change of an output signal in the trial imaging of the invention.

In this case, therefore, the document to be actually read is subjected at first to the trial imaging. In this trial imaging, the sensor is irradiated on its whole face with the non-uniform light. In this case, the graph of FIG. 10 illustrating the transition of the signal value against the row number is illustrated in FIG. 21. The highest value is used as the output signal amplitude value of each row. The largest output signal amplitude corresponds to the brightest case. It is found from FIG. 21 that the storage period on the n-th row at the third trial is optimum for the case in which the wholly blackish document is to be read. The storage period at this time is designated by Ts1.

If the wholly whitish document is to be image on trial, it is found from FIG. 21 that the storage period on the math row at the second trial is optimum. The storage period at this time is designated by Ts2.

Where the ordinary document is to be read, the storage period may be set to Ts2 for the imaging. Where the blackish document such as the newspaper is to be read, however, the storage period may be reset for the imaging. This reset makes the signal amplitude larger to improve the reading precision.

If the storage period is thus reset for the type of the document to be read, it is possible to read a clearer image. The optimum period reset can be easily found out for a short time by performing the trial imaging of Embodiment 1 or 2.

Embodiment 3

In Embodiments 1 and 2, the signals have been outputted from the pixels of the whole face for the trial imaging time. However, this trial imaging may be made on only an area in the screen. Therefore, this embodiment can be freely combined with Embodiment 1 or 2.

Figure 22:
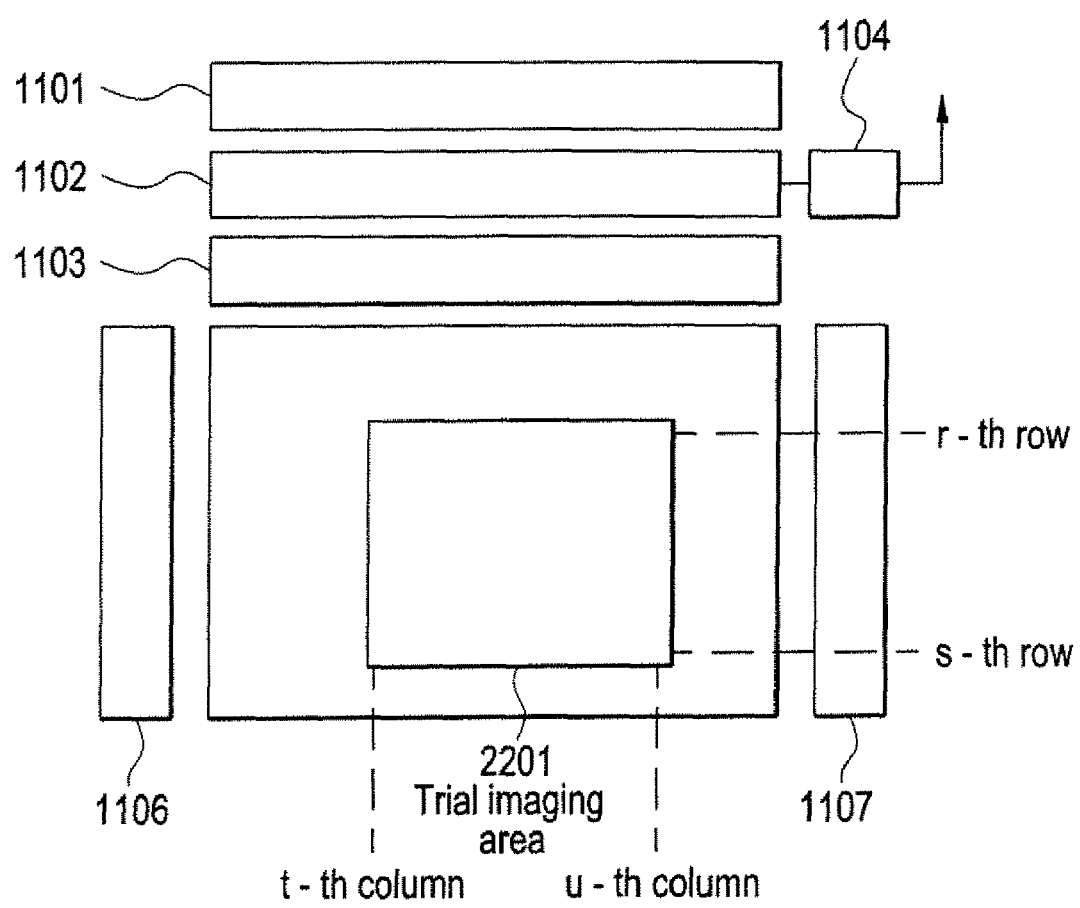
FIG. 22 is a diagram showing an area to be imaged on trial in an area sensor of the invention.

Let it be assumed that the trial imaging is made on the area of the pixels from the r-th row to the s-th row and from the t-th column to the u-th column, as illustrated in FIG. 22.

The signal timing chart at this time is as follows. At first, all the pixels, as contained in the object area to be imaged on trial, are simultaneously reset, although the pixels of the remaining areas may also be reset. After this, the signals are outputted from the r-th row. In short, the signals begin to be outputted from the r-th row after the reset but not from the first row.

The signals are outputted from the pixels of one row all at once, but what is necessary is the signals from the t-th column to the u-th column. Therefore, the remaining signals may be inhibited from going out of a final output amplifier circuit 1104 by controlling the waveform at a signal output line drive circuit 1101. Alternatively, the unnecessary signals may be ignored after the output of one row.

The waveform at the signal output line drive circuit 1101 can be controlled by using the well-known circuits or signals.

Next, the gate signal lines are scanned to output the signals from the (r+1)-th row and then from the (r+2)-th row, and these operations are repeated. After the outputting of the s-th row, the scanning is not proceeded to the (s+1)-th row but is returned to the r-th row to output the signals. And, the scanning is proceeded to the (r+1)-th row, and these operations are repeated.

In this way, the storage periods are made gradually longer for every rows. The storage period can be prevented from becoming discontinuous by returning the scanning to the r-th row after the outputting of the s-th row.

This control of the gate signal lines can be realized by using the well-known circuits and signals in a gate signal line drive circuit 1106.

This free reading of the signals can be made possible because the MOS sensor is of the random reset/read type. The free reading cannot be realized in the CCD sensor.

This embodiment, in which the determined area is exclusively imaged on trial, can be applied, for example, to the case in which the light from the object is incident on only the central portion of the screen whereas the light of no significance is incident on the peripheral portion of the screen. This case can be exemplified by the reading of a fingerprint.

Figure 23A:
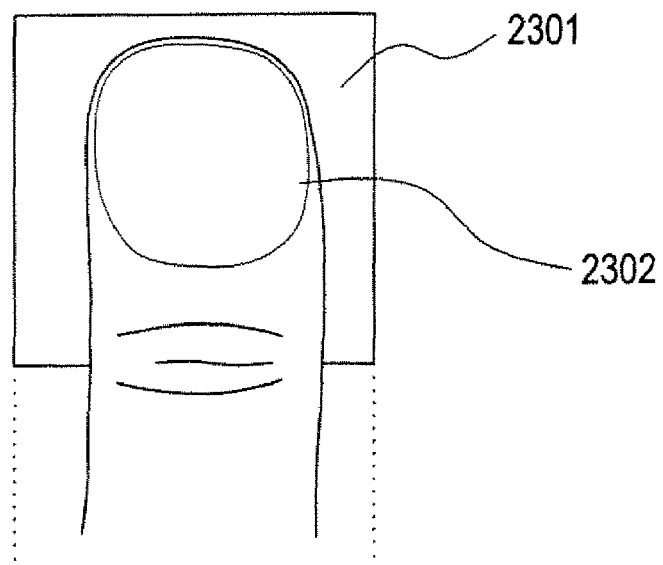
FIGS. 23A and 23B are diagrams showing the case in which a fingerprint is to be read in the area sensor of the invention.
Figure 23B:
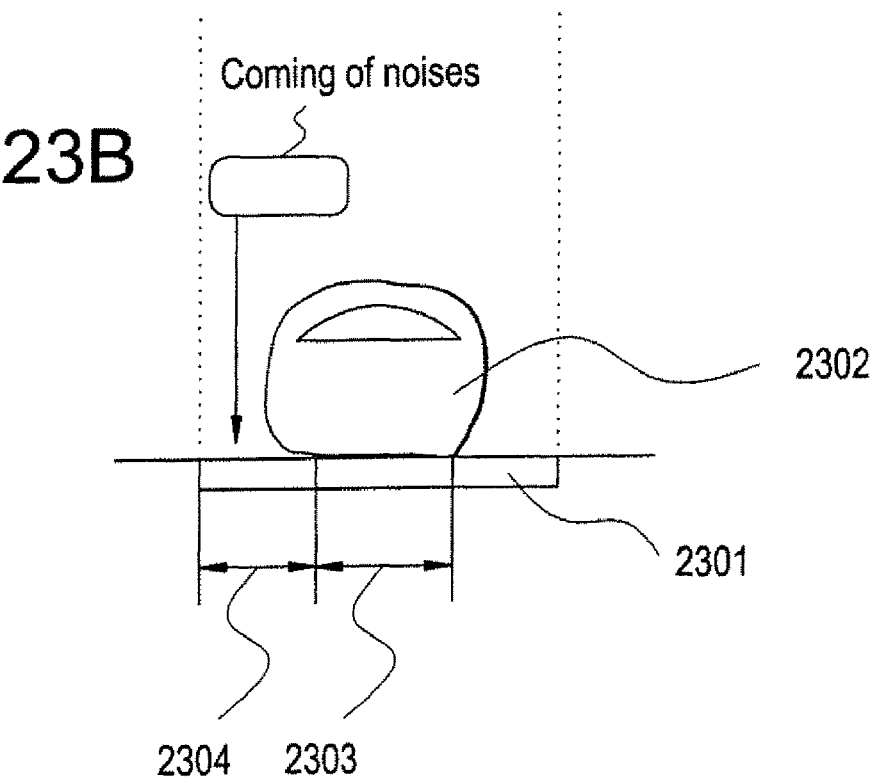

Thus, FIGS. 23A and 23B are schematic views showing the case in which a finger is placed on the screen to read out its print. FIG. 23A is a top plan view, and FIG. 23B is a sectional view. There is a pixel array 2301, in which a number of pixels are arranged. The imageable area is the entirety of the pixel array 2301. A reading object 2302 or the finger is placed on the area. However, the finger is actually placed on only an imaging object area 2303 but not on an imaging non-object area 2304. Into this imaging non-object area 2304, therefore, there comes noises such as the ambient light. In this case, the correct storage period cannot be found out if the whole screen is image on trial. Therefore, the trial imaging is made on the area where the finger is placed.

Figure 24:
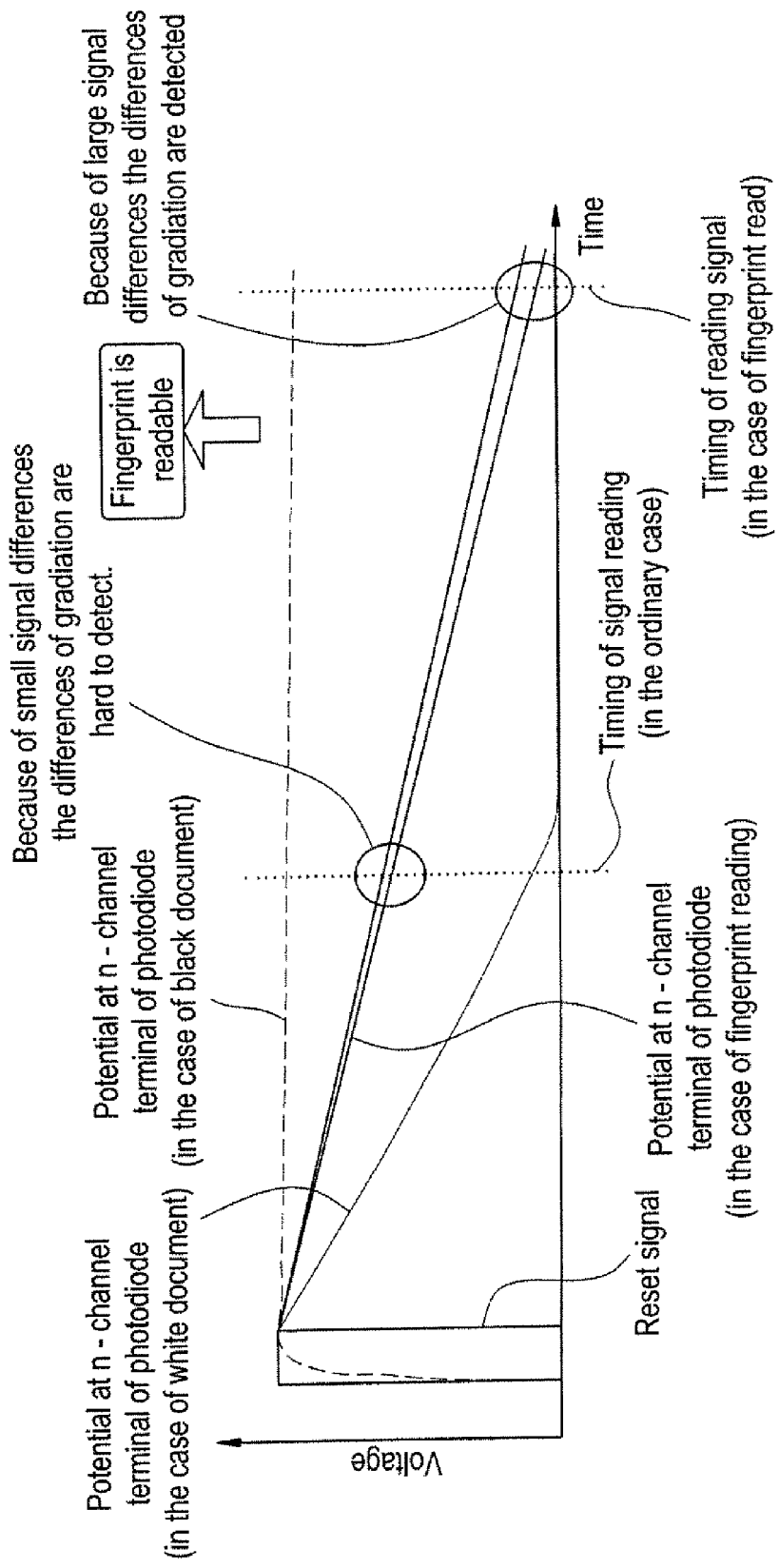
FIG. 24 is a timing chart in the invention.

When the fingerprint is to be read, on the other hand, its pattern undulations have close graduations. This makes it difficult to read the pattern precisely. FIG. 24 is a timing chart illustrating the potentials of the N-channel terminals of the photodiodes of pixels in the case of reading the fingerprint. At first, the pixels are reset. After this, the potentials of the N-channel terminals of the photodiodes becomes lower according to the optical intensity. The potentials hardly becomes lower, when the black document is to be read, but becomes drastically lower when the white document is to be read. In the ordinary case, the storage period is set so that the signals are not saturated when the white document is to be read. When the fingerprint is to be read, however, its pattern undulations have the close graduations so that N-channel terminals of the photodiodes also have close potentials. It is, therefore, difficult to read the pattern undulations of the fingerprint precisely.

In this case, the finger is pushed and imaged on trial by employing only the area pushed thereby as the object. Then, the sensor is irradiated with the heterogeneous light when the trial imaging is made. And, the period just before the signal (having the largest signal amplitude) of the brightest portion is saturated is adopted as the optimum storage period.

After the ordinary imaging, the potentials of the N-channel terminals of the photodiodes become so low that the potential difference between the signals of the undulations read from the fingerprint become large. This makes it so easy to detect the graduation differences so that even an image such as the fingerprint having the small graduation differences can be read out.

Embodiment 4

A method of manufacturing a sensor of this invention on a glass using a TFT is explained with reference to FIGS. 25A to 28B.

Figure 25A:
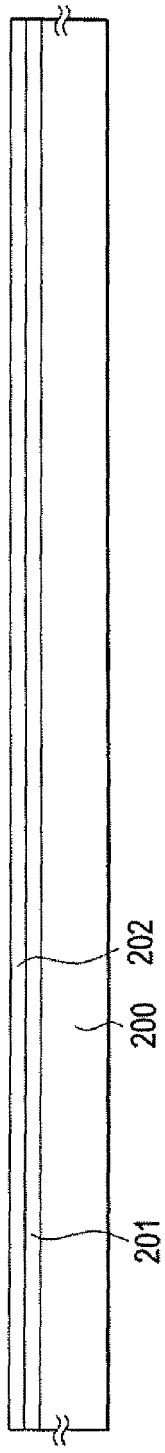
FIGS. 25A to 25D are diagrams showing a process for manufacturing an image sensor of the invention.

First, as shown in FIG. 25A, a base film 201 is formed to a thickness of 300 nm on a glass substrate 200. A silicon oxinitride film is laminated as the base film 201 in this embodiment. At this point, it is appropriate to set the nitrogen concentration to between 10 and 25 wt % in the film contacting the glass substrate 200. In addition, it is effective that the base film 201 has a thermal radiation effect, and a DLC (diamond-like carbon) film may also be provided.

Next, an amorphous silicon film (not shown in the figure) is formed with a thickness of 50 nm on the base film 201 by a known deposition method. Note that it is not necessary to limit to the amorphous silicon film, and a semiconductor film containing an amorphous structure (including a microcrystalline semiconductor film) may be used. In addition, a compound semiconductor film containing an amorphous structure, such as an amorphous silicon germanium film, may also be used. Further, the film thickness may be made from 20 to 100 nm.

The amorphous silicon film is then crystallized by a known technique, forming a crystalline silicon film (also referred to as a polycrystalline silicon film or a polysilicon film) 202. Thermal crystallization using an electric furnace, laser annealing crystallization using a laser light, and lamp annealing crystallization using an infrared light as known crystallization methods. Crystallization is performed in this embodiment using an excimer laser light, which uses XeCl gas.

Note that pulse emission excimer laser light formed into a linear shape is used in this embodiment, but a rectangular shape may also be used. Continuous emission type argon laser light and continuous emission type excimer laser light can also be used.

In this Example, although the crystalline silicon film is used as the active layer of the TFT, it is also possible to use an amorphous silicon film as the active layer.

Note that it is effective to form the active layer of a resetting transistor, in which there is a necessity to reduce the off current, by the amorphous silicon film, and to form the active layer of an amplifying transistor by the crystalline silicon film. Electric current flows with difficulty in the amorphous silicon film because the carrier mobility is low, and the off current does not easily flow. In other words, the most can be made of the advantages of both the amorphous silicon film, through which current does not flow easily, and the crystalline silicon film, through which current easily flows.

Figure 25B:
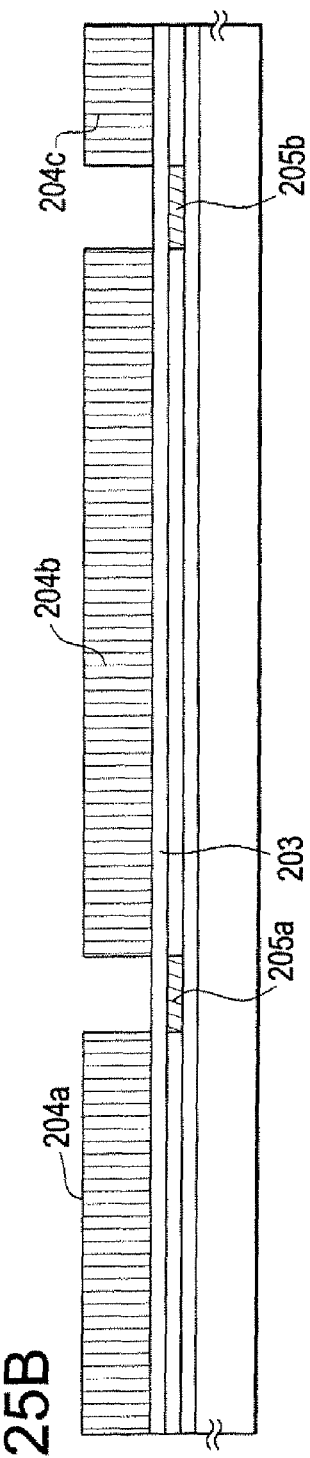
Figure 25C:
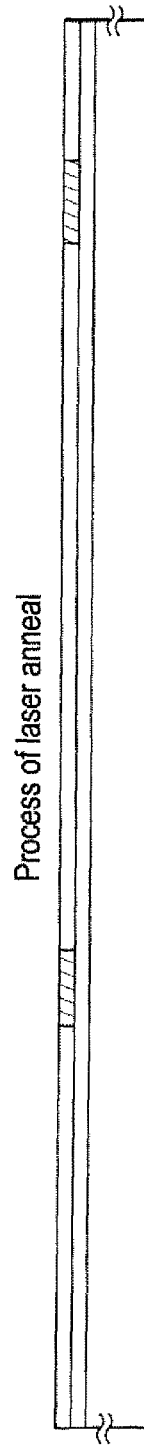

Next, as shown in FIG. 25B, a protective film 203 is formed on the crystalline silicon film 202 with a silicon oxide film having a thickness of 130 nm. This thickness may be chosen within the range of 100 to 200 nm (preferably between 130 and 170 nm). Furthermore, another films such as insulating films containing silicon may also be used. The protective film 203 is formed so that the crystalline silicon film is not directly exposed to plasma during addition of an impurity, and so that it is possible to have delicate concentration control of the impurity.

Resist masks 204a, 204b, and 204c are then formed on the protective film 203, and an impurity element, which imparts n-type conductivity (hereafter referred to as an n-type impurity element), is added through the protective film 203. Note that elements residing in periodic table group 15 are generally used as the n-type impurity element, and typically phosphorous or arsenic can be used. Note that a plasma doping method is used, in which phosphine ($PH_3$) is plasma-excited without separation of mass, and phosphorous is added at a concentration of $1\times10^{18}$ atoms/cm$^3$ in this embodiment. An ion implantation method, in which separation of mass is performed, may also be used, of course.

The dose amount is regulated such that the n-type impurity element is contained in n-type impurity regions (b) 205a, 205b thus formed by this process, at a concentration of $2\times10^{16}$ to $5\times10^{19}$ atoms/cm$^3$ (typically between $5\times10^{17}$ and $5\times10^{18}$ atoms/cm$^3$).

Next, as shown in FIG. 26C, the protective film 203 and the resist masks 204a, 204b, and 204c are removed, and an activation of the added n-type impurity elements is performed. A known technique of activation may be used as the means of activation, but activation is done in this embodiment by irradiation of excimer laser light (laser annealing). Of course, a pulse emission excimer laser and a continuous emission excimer laser may be used, and it is not necessary to place any limits on the use of excimer laser light. The goal is the activation of the added impurity element, and it is preferable that irradiation is performed at an energy level at which the crystalline silicon film does not melt. Note that the laser light irradiation may also be performed with the protective film 203 in place.

The activation of impurity elements by heat treatment (furnace annealing) may also be performed along with the activation of the impurity element by laser light. When activation is performed by heat treatment, considering the heat resistance of the substrate, it is good to perform heat treatment at about 450 to 550° C.

A boundary portion (connecting portion) with end portions of the n-type impurity regions (b) 205a, 205b, namely regions, in which the n-type impurity element is not added, on the periphery of the n-type impurity regions (b) 205a, 205b, is delineated by this process. This means that, at the point when the TFTs are later completed, extremely good connecting portion can be formed between LDD regions and channel forming regions.

Figure 25D:
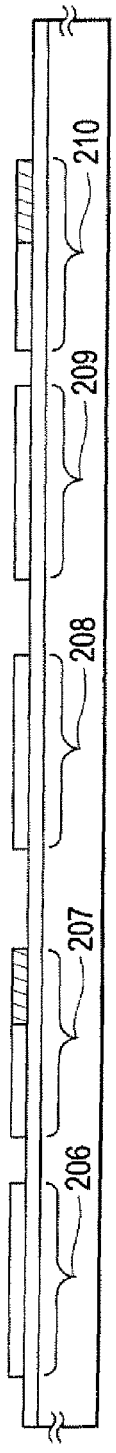

Unnecessary portions of the crystalline silicon film are removed next, as shown in FIG. 25D, and island-shape semiconductor films (hereinafter referred to as active layers) 206 to 210 are formed.

Then, as shown in FIG. 26A, a gate insulating film 211 is formed, covering the active layers 206 to 210. An insulating film containing silicon and with a thickness of 10 to 200 nm, preferably between 50 and 150 nm, may be used as the gate insulating film 211. A single layer structure or a lamination structure may be used. A 110 nm thick silicon oxinitride film is used in this embodiment.

Thereafter, a conductive film having a thickness of 200 to 400 nm is formed and patterned to form gate electrodes 212 to 216. In Example 4, the gate electrodes and wirings (hereinafter referred to as gate wirings) electrically connected to the gate electrodes for providing conductive paths are formed of the same materials. Of course, the gate electrode and the gate wiring may be formed of different materials from each other. More specifically, the gate wirings are made of a material having a lower resistivity than the gate electrodes. This is because a material enabling fine processing is used for the gate electrodes, while the gate wirings are formed of a material that can provide a smaller wiring resistance but is not suitable for fine processing. The wiring resistance of the gate wiring can be made extremely small by using this type of structure, and therefore a sensor unit having a large surface area can be formed. Namely, the above described pixel structure is extremely effective when an area sensor with a sensor unit having a screen size of a 10 inch diagonal or larger (in addition, a 30 inch or larger diagonal) is realized.

Although the gate electrode can be made of a single-layered conductive film, it is preferable to form a lamination film with two layers or three layers, if necessary. Any known conductive films can be used for a material of the gate electrodes 212 to 216.

Typically, it is possible to use a film made of an element selected from the group consisting of aluminum (Al), tantalum (Ta), titanium (Ti), molybdenum (Mo), tungsten (W), chromium (Cr), and silicon (Si), a film of nitride of the above element (typically a tantalum nitride film, tungsten nitride film, or titanium nitride film), an alloy film of combination of the above elements (typically Mo—W alloy or Mo—Ta alloy), or a silicide film of the above element (typically a tungsten silicide film or a titanium silicide film). Of course, the films may be used as a single layer or a laminate layer.

In this embodiment, a laminate film of a tungsten nitride (WN) film having a thickness of 30 nm and a tungsten (W) film having a thickness of 370 nm is used. This may be formed by sputtering. When an inert gas such as Xe or Ne is added as a sputtering gas, film peeling due to stress can be prevented.

The gate electrodes 213 and 216 are respectively formed at this time so as to overlap a portion of the n-type impurity regions (b) 205a and 205b through the gate insulating film 211. This overlapping portion later becomes an LDD region overlapping the gate electrode.

Next, an n-type impurity element (phosphorous is used in this embodiment) is added in a self-aligning manner with the gate electrodes 212 to 216 as masks, as shown in FIG. 26B. The addition is regulated such that phosphorous is added to n-type impurity regions (c) 217 to 224 thus formed at a concentration of $\frac{1}{10}$ to $\frac{1}{2}$ that of the n-type impurity regions (b) 205a and 205b (typically between $\frac{1}{4}$ and $\frac{1}{3}$). Specifically, a concentration of $1\times10^{16}$ to $5\times10^{18}$ atoms/cm$^3$ (typically $3\times10^{17}$ to $3\times10^{18}$ atoms/cm$^3$) is preferable.

Resist masks 225a to 225c are formed next, with a shape covering the gate electrodes 212, 214 and 215, as shown in FIG. 27C, and an n-type impurity element (phosphorous is used in this embodiment) is added, forming n-type impurity regions (a) 226 to 233 containing phosphorous at high concentration. Ion doping using phosphine ($PH_3$) is also performed here, and the phosphorous concentration of these regions is regulated so as to be set to from $1\times10^{20}$ to $1\times10^{21}$ atoms/cm$^3$ (typically between $2\times10^{20}$ and $5\times10^{21}$ atoms/cm$^3$).

A source region or a drain region of the n-channel TFT is formed by this process, and in the n-channel TFT, a portion of the n-type impurity regions 217, 218, 222, and 223 formed by the process of FIG. 26B is remained. These remaining regions correspond to LDD regions.

Next, as shown in FIG. 26D, the resist masks 225a to 225c are removed, and new resist masks 234a and 234b are formed. A p-type impurity, element (boron is used in this embodiment) is then added, forming p-type impurity regions 235 and 236 containing boron at high concentration. Boron is added here at a concentration of $3\times10^{20}$ to $3\times10^{21}$ atoms/cm$^3$ (typically between $5\times10^{20}$ and $1\times10^{21}$ atoms/cm$^3$) by ion doping using diborane (B$_2$H$_6$).

Note that phosphorous has already been added to the impurity regions 235 and 236 at a concentration of $1\times10^{20}$ to $1\times10^{21}$ atoms/cm$^3$, but boron is added here at a concentration of at least 3 times or more that of the phosphorous. Therefore, the n-type impurity regions already formed completely invert to p-type, and function as p-type impurity regions.

Next, after removing the resist masks 234a and 234b, the n-type or p-type impurity elements added at respective concentrations are activated. Furnace annealing, laser annealing or lamp annealing can be used as a means of activation. In this embodiment, heat treatment is performed for 4 hours at 550° C. in a nitrogen atmosphere in an electric furnace.

At this time, it is important to eliminate oxygen from the surrounding atmosphere as much as possible. This is because an exposed surface of the gate electrode is oxidized, which results in an increased resistance if only a small amount of oxygen exists. Accordingly, the oxygen concentration in the surrounding atmosphere for the above activation process is set at 1 ppm or less, preferably at 0.1 ppm or less.

A first interlayer insulating film 237 is formed next, as shown in FIG. 27A. A single layer insulating film containing silicon is used as the first interlayer insulating film 237, or a lamination film combined there may be used. Further, a film thickness of between 400 nm and 1.5 μm may be used. A lamination structure of a silicon oxide film having a thickness of 800 nm on a silicon oxinitride film having a thickness of 200 nm thick is used in this embodiment.

In addition, heat treatment is performed for 1 to 12 hours at 300 to 450° C. in an atmosphere containing between 3 and 100% hydrogen, performing hydrogenation. In this process, dangling bands of the semiconductor film are terminated by the thermally a excited hydrogen. Plasma hydrogenation (using hydrogen excited by plasma) may also be performed as another means of hydrogenation.

Note that the hydrogenation processing may also be inserted during the formation of the first interlayer insulating film 237. Namely, hydrogen processing may be performed as above after forming the 200 nm thick silicon oxinitride film, and then the remaining 800 nm thick silicon oxide film may be formed.

Next, a contact hole is formed in the gate insulating film 211 and the first interlayer insulating film 237, and source wirings 238 to 242 and drain wirings 243 to 247 are formed. In this Example, this electrode is made of a laminate film of three-layer structure in which a titanium film having a thickness of 100 nm, an aluminum film containing titanium and having a thickness of 300 nm, and a titanium film having a thickness of 150 nm are continuously formed by sputtering. Of course, other conductive films may be used.

A first passivation film 248 is formed next with a thickness of 50 to 500 nm (typically between 200 and 300 nm). A 300 nm thick silicon oxinitride film is used as the first passivation film 248 in this embodiment. This may also be substituted by a silicon nitride film. Note that it is effective to perform plasma processing using a gas containing hydrogen such as H$_2$ or NH$_3$ before the formation of the silicon oxinitride film. Hydrogen activated by this preprocess is supplied to the first interlayer insulating film 237, and the film quality of the first passivation film 248 is improved by performing heat treatment. At the same time, the hydrogen added to the first interlayer insulating film 237 diffuses to the lower layer side, and the active layers can be hydrogenated effectively.

Next, a second interlayer insulating film 249 made of organic resin is formed as shown in FIG. 27B. As the organic resin, it is possible to use polyimide, polyamide, acryl, BCB (benzocyclobutene) or the like. Especially, since the second interlayer insulating film 249 is primarily used for leveling, acryl excellent in leveling properties is preferable. In this embodiment, an acrylic film is formed to a thickness sufficient to level a stepped portion formed by TFTs. It is appropriate that the thickness is made 1 to 5 μm (more preferably, 2 to 4 μm).

Next, a contact hole is formed in the second interlayer insulating film 249 and the first passivation film 248 so as to reach the drain wiring 245, and a cathode electrode 250 of a photodiode is formed so as to contact the drain wiring 245. In this embodiment, an aluminum film formed by sputtering is used as the cathode electrode 250, but other metals, for example titanium, tantalum, tungsten, and copper can also be used. Further, a lamination film made from titanium, aluminum, and titanium may also be used.

Patterning is next performed after depositing an amorphous silicon film containing hydrogen over the entire surface of the substrate, and a photoelectric conversion layer 251 is formed. Then, a transparent conductive film is formed on the entire surface of the substrate. A 200 nm thick ITO film is deposited by sputtering as the transparent conductive film in this embodiment. The transparent conductive film is patterned, forming an anode electrode 252. (FIG. 27C.)

Figure 28A:
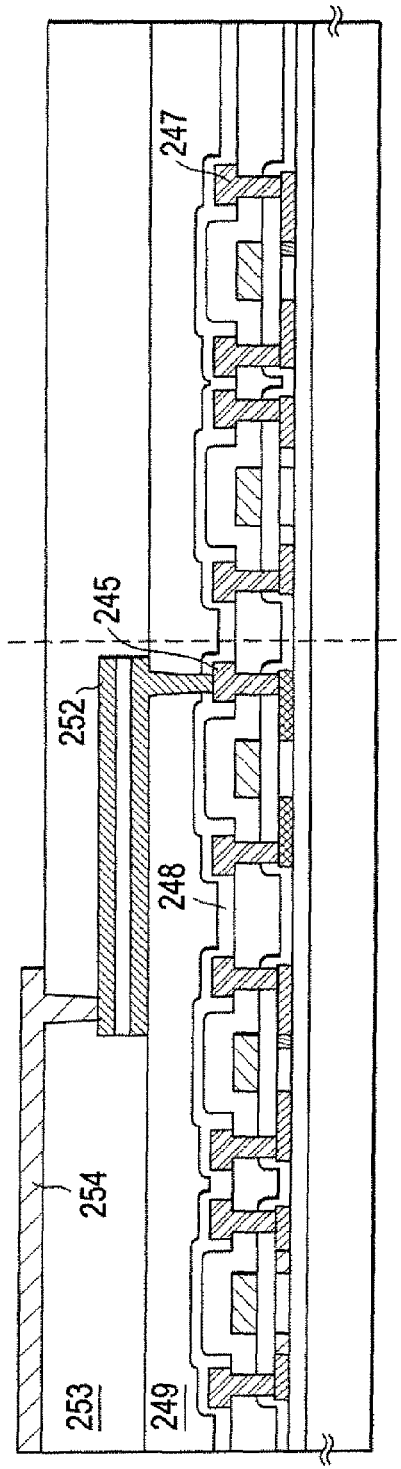
FIGS. 28A and 28B are diagrams showing the process for manufacturing the image sensor of the invention.

A third interlayer insulating film 253 is then formed, as shown in FIG. 28A. A level surface can be obtained by using a resin such as polyimide, polyamide, polyimide amide, or acrylic as the third interlayer insulating film 253. A polyimide film having a thickness of 0.7 μm is formed over the entire surface of the substrate as the third interlayer insulating film 253 in this embodiment.

A contact hole is next formed in the third interlayer insulating film 253 so as to reach the anode electrode 252, and a sensor wiring 254 is formed. A 300 nm thick aluminum alloy film (an aluminum film comprising titanium of 1 wt %) is formed in this embodiment.

Figure 28B:
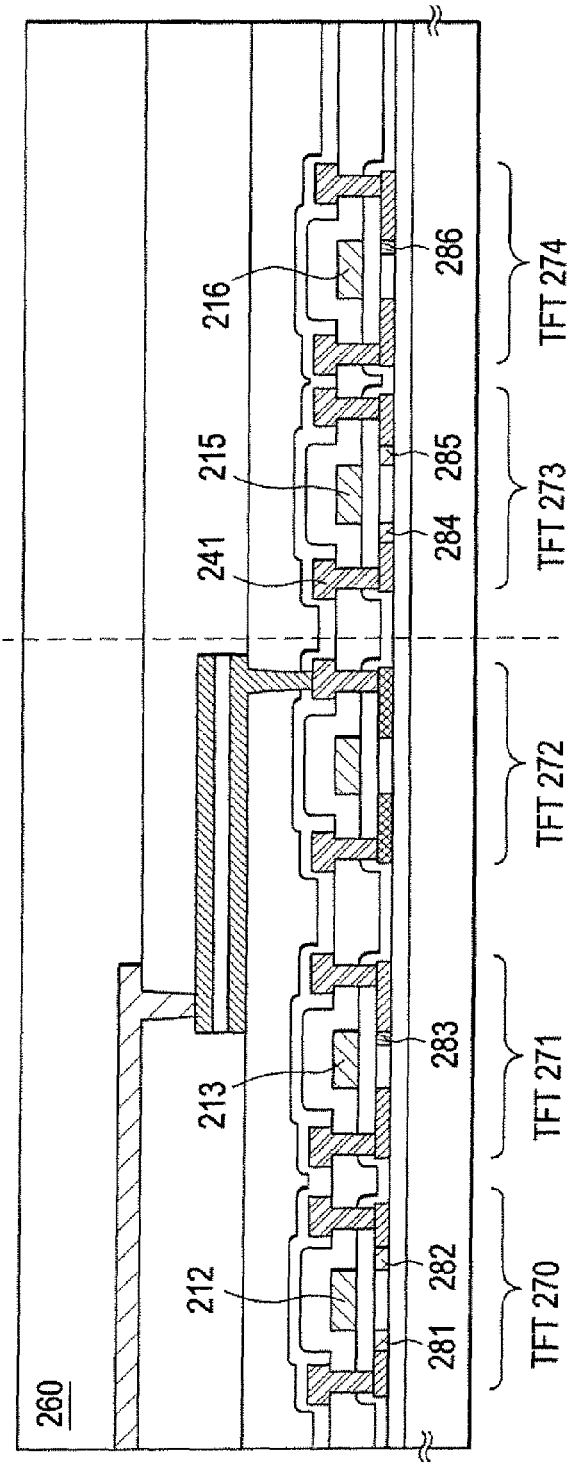

Thus, the sensor substrate is formed which has the structure as shown in FIG. 28B.

Reference numeral 270 shows an amplifying TFT, 271 shows a switching TFT, 272 shows a resetting TFT, 273 shows a biasing TFT and 274 shows a discharge TFT.

In this embodiment, the amplifying TFT and the biasing TFT are n-channel TFTs, and at both source region sides and drain region sides of the respective TFTs, LDD regions 281 to 284 are respectively formed. Note that the LDD regions 281 to 284 do not overlap with the gate electrodes 212 and 215 through the gate insulating film 211. The above construction makes it possible to reduce a hot carrier injection in the amplifying TFT 270 and the biasing TFT 273.

In this embodiment, the switching TFT 271 and the discharging TFT 274 are n-channel TFTs, and at only respective drain region sides, LDD regions 283 and 286 are respectively formed. Note that the LDD regions 283 and 286 overlap with the gate electrodes 213 and 216 through the gate insulating film 211.

The formation of the LDD regions 283 and 286 on only the drain region side is in consideration of reducing the hot carrier injection and not causing the operating speed to drop. Further, it is not necessary to be too concerned with the value of the off current for the switching TFT 271 and a discharging TFT 274, and more importance may be placed on the operating speed. It is therefore preferable for the LDD regions 283 and 286 to completely overlap with the gate electrodes 213 and 216, and to reduce resistive components as much as possible. Namely, the so-called offset should be eliminated. In particular, when the source signal line drive circuit or the gate signal line driving circuit is driven at 15V to 20V, the above constitution of the discharging TFT 274 of the this embodiment is effective to reduce the hot carrier injection and also not to drop the operation speed.

Furthermore, in this embodiment, a resetting TFT 272 is p-channel TFT and has no LDD region. Degradation due to hot carrier injection is almost of no concern for the p-channel TFTs, and therefore LDD regions do not have to be formed in particular. It is also possible, of course, to form an LDD region similar to that of an n-channel TFT and to take action against hot carriers. Further, the resetting TFT 272 may be an n-channel type TFT.

Further, by attaching a connector (flexible printed circuit, FPC) for connecting terminals pulled around from the elements or the circuits formed on the substrate with external signal terminals, the sensor is completed.

Note that it is possible to freely combine Embodiment 4 with Embodiments 1 to 3.

Note that the present invention can be accomplished by using a mono-crystal silicon substrate.

Embodiment 5

The sensor formed by implementing the present invention can be used in various electronic apparatus. As such electronic apparatus of the present invention, there are pointed out a scanner, a digital still camera, an X-ray camera, a portable information terminal (a mobile computer, a portable telephone, a portable game machine), a note-type personal computer, a game machine, a television telephone and finger print read machine.

Figure 29A:
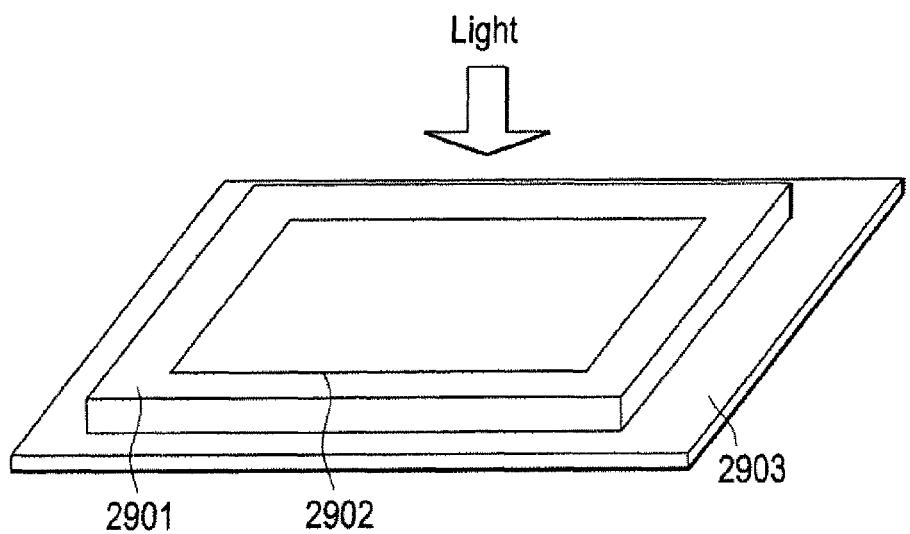
FIGS. 29A and 29B are diagrams of electronic devices using the image sensor of the invention.
Figure 29B:
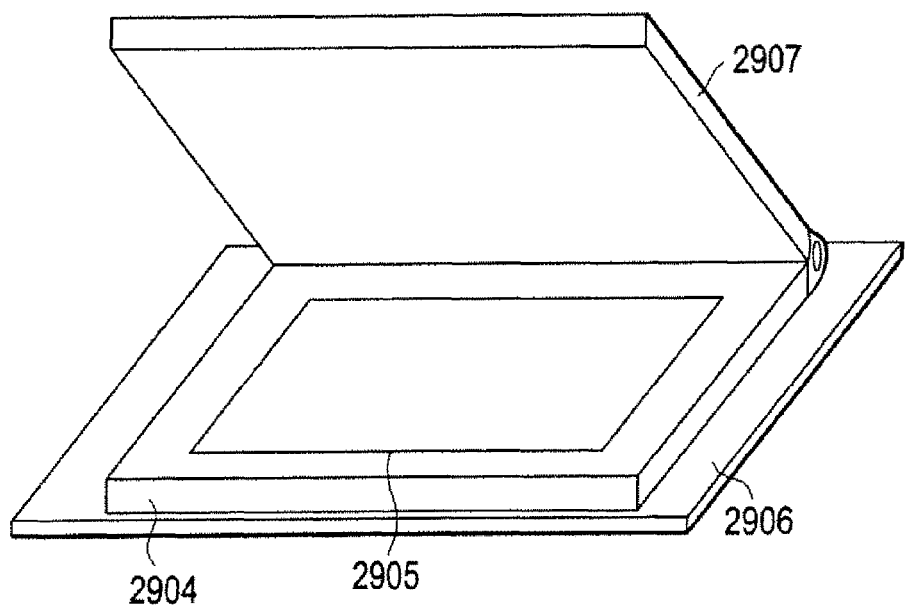

FIG. 29A shows a scanner 2901 using the close contact type sensor and including a sensor unit 2902. The scanner 2901 is arranged above a reading object 2903. The close contact type sensor is fabricated by forming TFTs on a glass substrate. Since the close contact type sensor does not use compact optical system, miniature machines can be achieved. As light for illuminating the reading object 2903, room light is utilized. Thereby, an exclusive light source is not needed. In this case, intensities of light change depending on imaging environment. Therefore, by applying the present invention, optimum storage period can be found quickly. The present invention can be used in the sensor unit 2902.

In FIG. 29E, in contrast to FIG. 29A, an exclusive light source 2907 is arranged. When positions of a reading region and a sensor unit 2905 are aligned, the light source 2907 is lifted thereabove. Further, positions thereof are aligned by viewing a reading object 2906 via an irradiation window of the sensor unit 2905. In reading an image, the light source 2907 and a scanner 2904 are overlapped and used. The present invention can be used in the sensor unit 2905.

Figure 30A:
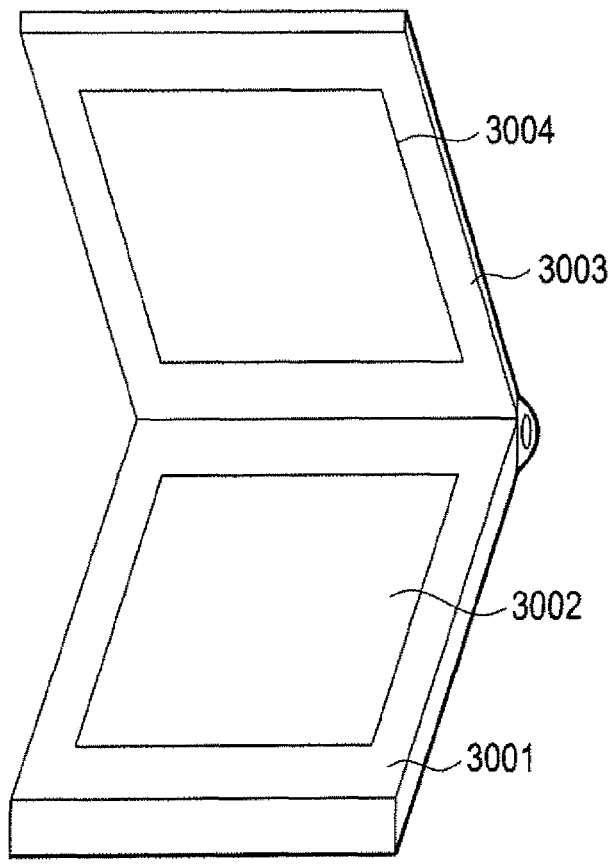
FIGS. 30A and 30B are diagrams of electronic devices using the image sensor of the invention.
Figure 30B:
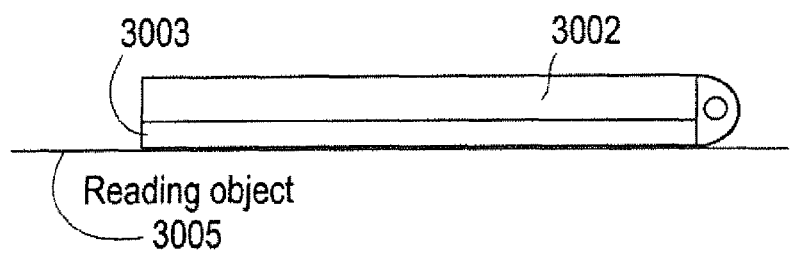

FIG. 30A shows a portable information terminal 3001 including a liquid crystal display 3002, a scanner 3003 using the close contact type sensor and a sensor unit 3004. When the scanner is used, as shown by a sectional view of FIG. 30B, the liquid crystal display 3002 and the scanner 3003 are overlapped, the scanner 2901 is arranged above a reading object 3005 and the liquid crystal display 3002 is arranged thereabove. As irradiation light, light of the liquid crystal display 3002 is utilized. Thereby, an exclusive light source is not needed. The present invention can be used in the sensor unit 3004.

Figure 31:
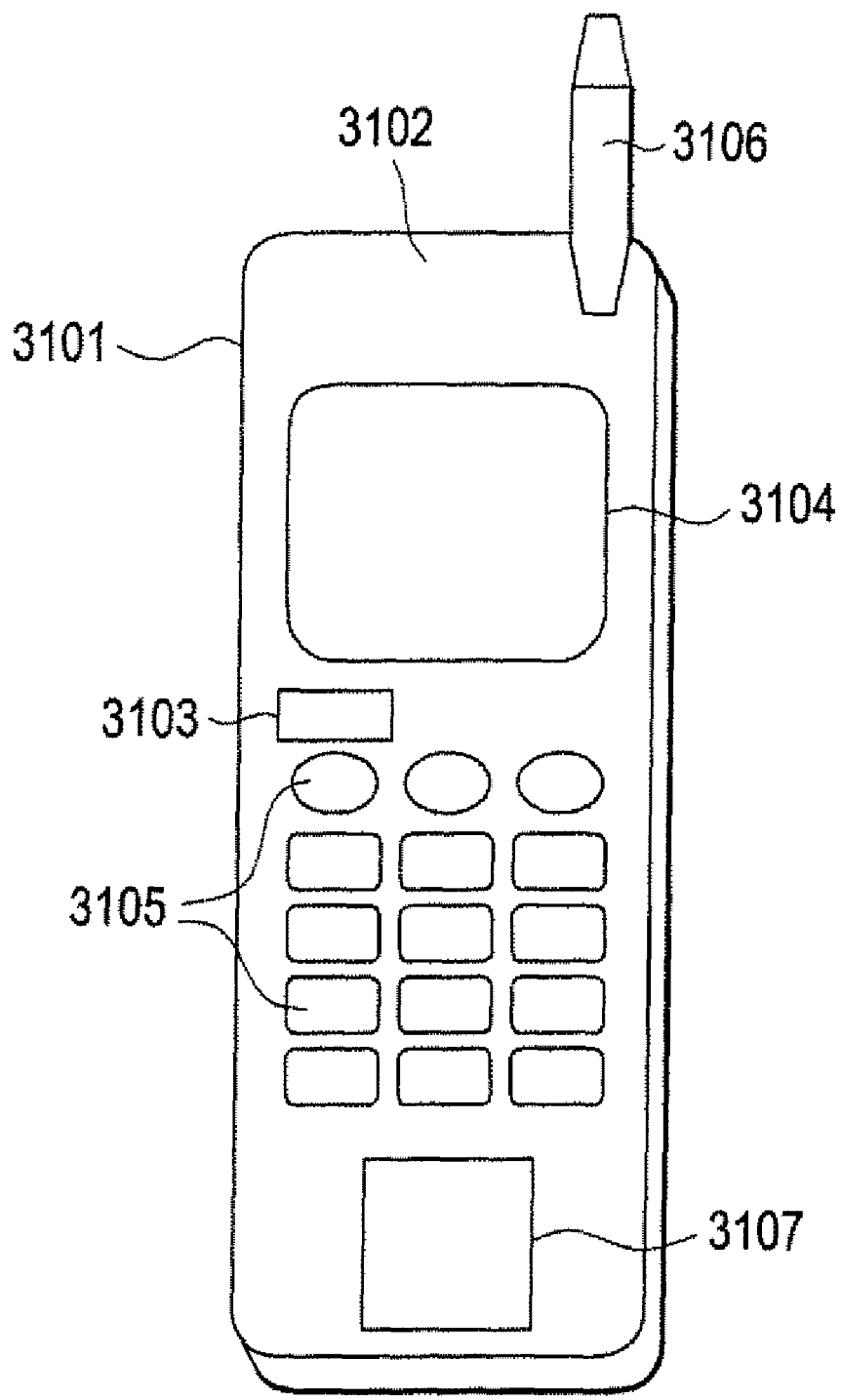
FIG. 31 is a diagram of an electronic device using the image sensor of the invention.

Here, in this embodiment, FIG. 31 shows a portable telephone including a main body 3101, a voice output portion 3102, a voice input portion 3103, a display device 3104, an operation switch 3105, an antenna 3106, and a sensor unit 3107. The present invention can be applied to the sensor unit 3107. In the sensor unit, fingerprints can be read. Further, the present invention can be used for a sensor unit of a television telephone.

By making the trial imaging operations with the different storage periods for every pixels, according to the invention, the optimum storage period can be determined for a short time. By setting the storage period to the optimum value, moreover, the image can be read out highly precisely.

What is claimed is:

1. A semiconductor device comprising:
a pixel portion comprising a plurality of pixels;
a gate drive circuit electrically connected to the pixel portion;
a bias circuit electrically connected to the pixel portion; and
a sample-and-hold circuit electrically connected to the bias circuit;
wherein a part of the plurality of pixels are used to determine a storage period, and configured to perform a first imaging,
wherein all of the plurality of the pixels are configured to perform a second imaging to acquire an image in accordance with the storage period,
wherein the first imaging comprises resetting the plurality of pixels at a same time, and selecting the plurality of pixels sequentially to output signals of the selected pixels, and
wherein the second imaging comprises resetting the plurality of pixels sequentially, and selecting the plurality of pixels sequentially.

2. The semiconductor device according to claim 1, wherein the sample-and-hold circuit comprises a transistor.

3. The semiconductor device according to claim 2, wherein the transistor is a thin film transistor.

4. The semiconductor device according to claim 1, wherein the bias circuit comprises a transistor.

5. The semiconductor device according to claim 4, wherein the transistor is a thin film transistor.

6. A semiconductor device comprising:
a pixel portion comprising a plurality of pixels;
a gate drive circuit electrically connected to the pixel portion;
a bias circuit electrically connected to the pixel portion; and
a sample-and-hold circuit electrically connected to the bias circuit;
wherein a part of the plurality of pixels are configured to perform a first imaging to determine a storage period,
wherein all of the plurality of the pixels are configured to perform a second imaging to acquire an image in accordance with the storage period,
wherein each of the pixels comprises a photodiode and a transistor, wherein the first imaging comprises resetting the part of the plurality of pixels at a same time, and selecting the part of the plurality of pixels sequentially to output signals of the selected pixels, and wherein the second imaging comprises resetting all of the plurality of pixels sequentially, and selecting all of the plurality of pixels sequentially after the storage period from resetting all of the plurality of pixels sequentially.

7. The semiconductor device according to claim 6, wherein the sample-and-hold circuit comprises a transistor.

8. The semiconductor device according to claim 7, wherein the transistor is a thin film transistor.

9. The semiconductor device according to claim 6, wherein the bias circuit comprises a transistor.

10. The semiconductor device according to claim 9, wherein the transistor is a thin film transistor.

11. The semiconductor device according to claim 6, wherein the transistor is a thin film transistor.

12. A method for driving a semiconductor device, the semiconductor device comprising:
    a pixel portion comprising a plurality of pixels;
    a gate drive circuit electrically connected to the pixel portion;
    a bias circuit electrically connected to the pixel portion; and
    a sample-and-hold circuit electrically connected to the bias circuit;
    said method comprising the steps of:
        determining a storage period by using a part of the plurality of pixels by performing a first imaging, and
        acquiring an image by all of the plurality of the pixels in accordance with the storage period by performing a second imaging,
    wherein the first imaging comprises the steps of:
        resetting the part of the plurality of pixels at a same time: and
        selecting the part of the plurality of pixels sequentially to output signals of the selected pixels, and
    wherein the second imaging comprises the steps of:
        resetting all of the plurality of pixels sequentially; and
        selecting all of the plurality of pixels sequentially, after the storage period from resetting all of the plurality of pixels sequentially.

13. The semiconductor device according to claim 12, wherein the sample-and-hold circuit comprises a transistor.

14. The semiconductor device according to claim 13, wherein the transistor is a thin film transistor.

15. The semiconductor device according to claim 12, wherein the bias circuit comprises a transistor.

16. The semiconductor device according to claim 15, wherein the transistor is a thin film transistor.

17. A method for driving a semiconductor device, the semiconductor device comprising:
    a pixel portion comprising a plurality of pixels;
    a gate drive circuit electrically connected to the pixel portion;
    a bias circuit electrically connected to the pixel portion; and
    a sample-and-hold circuit electrically connected to the bias circuit,
    wherein each of the pixels comprises a photodiode and a transistor,
    said method comprising the steps of:
        determining a storage period by using a part of the plurality of pixels by performing a first imaging, and
        acquiring an image by all of the plurality of the pixels in accordance with the storage period by performing a second imaging,
    wherein the first imaging comprises the steps of:
        resetting the part of the plurality of pixels at a same time; and
        selecting the part of the plurality of pixels sequentially to output signals of the selected pixels, and
    wherein the second imaging comprises the steps of:
        resetting all of the plurality of pixels sequentially; and
        selecting all of the plurality of pixels sequentially after the storage period from resetting all of the plurality of pixels sequentially.

18. The semiconductor device according to claim 17, wherein the sample-and-hold circuit comprises a transistor.

19. The semiconductor device according to claim 18, wherein the transistor is a thin film transistor.

20. The semiconductor device according to claim 17, wherein the bias circuit comprises a transistor.

21. The semiconductor device according to claim 20, wherein the transistor is a thin film transistor.

22. The semiconductor device according to claim 17, wherein the transistor is a thin film transistor.

23. The semiconductor device according to claim 1,
    wherein the plurality of pixels are configured to perform the first imaging to determine a storage period, and
    wherein the plurality of pixels are configured to perform the second imaging to acquire an image in accordance with the storage period.

24. The semiconductor device according to claim 23,
    wherein the second imaging comprises selecting the plurality of pixels sequentially after the storage period from resetting all of the plurality of pixels sequentially.

* * * * *